(12) United States Patent
Roesler et al.

(10) Patent No.: US 7,142,075 B1
(45) Date of Patent: Nov. 28, 2006

(54) MICROELECTROMECHANICAL POWER GENERATOR AND VIBRATION SENSOR

(75) Inventors: Alexander W. Roesler, Tijeras, NM (US); Todd R. Christenson, Albuquerque, NM (US)

(73) Assignee: Sandia Corporation, Alburquerque, NM (US)

( * ) Notice: Subject to any disclaimer, the term of this patent is extended or adjusted under 35 U.S.C. 154(b) by 204 days.

(21) Appl. No.: 10/817,786

(22) Filed: Apr. 1, 2004

(51) Int. Cl.
*H01H 51/22* (2006.01)
(52) U.S. Cl. .................................. 335/78; 200/181
(58) Field of Classification Search ............. 335/78; 200/181
See application file for complete search history.

(56) References Cited

U.S. PATENT DOCUMENTS

| | | | |
|---|---|---|---|
| 5,501,893 A | 3/1996 | Laermer et al. | |
| 6,375,759 B1 | 4/2002 | Christenson et al. | |
| 6,611,140 B1* | 8/2003 | Bloechl et al. | 324/207.21 |
| 2004/0246647 A1* | 12/2004 | Schindler | 361/147 |

OTHER PUBLICATIONS

C. B. Williams, R. C. Woods and R. B. Yates, "Feasibility Study of a Vibration Powered Micro-Electric Generator" IEE Colloquim on Compact Power Sources, May 8, 1996.
R. Amirtharajah and A. P. Chandrakasan, "Self-Powered Signal Processing Using Vibration-Based Power Generation," IEEE Journal of Solid-State Circuits, vol. 33, No. 5 May 1998 pp. 687-695.
Shin-nosuke Suzuki, Tamotsu Katane, Hideo Saotome and Osami Saito, "A Proposal of Electric Power Generating System for Implanted Medical Devices," IEEE Transactions on Magnetics, vol. 35, No. 5 Sep. 1999 pp. 3586-3588.
Tsung-Shune Chin, "Permanent magnet films for applications in microelectromechanical systems," Journal of Magnetism and Magnetic Materials, 2000 pp. 75-79.
M. El-hami, P. Glynne-Jones, N.M. White, M. Hill, S. Beeby, E. James, A.D. Brown, J.N. Ross, "Design and fabrication of a new vibration-based electromechanical power generator," Sensors and Actuators, Nov. 2000, pp. 335-342.
P. Glynne-Jones, S.P. Beeby and N.M. White, "Towards a piezoelectric vibration-powered microgenerator," IEE Proc. -Sci. Meas. Technol., vol. 148, No. 2 Mar. 2001 pp. 68-72.
C. B. Williams, C. Shearwood, M. A. Harradine, P.H. Mellor, T.S. Birch and R. B. Yates, "Development of an electromagnetic microgenerator," IEE Proc. -Circuits Devices Syst. vol. 148, No. 6 Dec. 2001 pp. 337-342.
Neil N. H. Ching, H. Y. Wong, Wen J. Li, Phillip H. W. Leong, Zhiyu Wen, "A laser-micromachined multi-modal resonating power transducer for wireless sensing systems," Sensors and Actuators, 2002, pp. 685-690.

* cited by examiner

*Primary Examiner*—Elvin Enad
*Assistant Examiner*—Bernard Rojas
(74) *Attorney, Agent, or Firm*—John P. Hohimer

(57) ABSTRACT

A microelectromechanical (MEM) apparatus is disclosed which can be used to generate electrical power in response to an external source of vibrations, or to sense the vibrations and generate an electrical output voltage in response thereto. The MEM apparatus utilizes a meandering electrical pickup located near a shuttle which holds a plurality of permanent magnets. Upon movement of the shuttle in response to vibrations coupled thereto, the permanent magnets move in a direction substantially parallel to the meandering electrical pickup, and this generates a voltage across the meandering electrical pickup. The MEM apparatus can be fabricated by LIGA or micromachining.

30 Claims, 12 Drawing Sheets

MICROELECTROMECHANICAL POWER GENERATOR AND VIBRATION SENSOR

GOVERNMENT RIGHTS

This invention was made with Government support under Contract No. DE-AC04-94AL85000 awarded by the U.S. Department of Energy. The Government has certain rights in the invention.

CROSS REFERENCE TO RELATED APPLICATIONS

This application is related to co-pending application Ser. No. 10/817,007 entitled "Method for Forming Permanent Magnets with Different Polarities for Use in Microelectromechanical Devices" filed on Apr. 1, 2004.

FIELD OF THE INVENTION

The present invention relates in general to microelectromechanical (MEM) devices, and in particular to MEM devices which include a plurality of permanent magnets and which are responsive to vibrations to generate an electrical voltage for producing electrical power, for sensing the presence of the vibrations, or for sensing a sudden acceleration or impact.

BACKGROUND OF THE INVENTION

Microelectromechanical (MEM) fabrication technologies such as surface and bulk micromachining and LIGA (an acronym based on the first letters for the German words for lithography, electroplating and injection molding) have been extensively developed in recent years to form many different types of microsystems and microsensors. For certain uses, these Microsystems and microsensors would benefit considerably from a long-life internal power supply. For example, microsensors or microsystems placed inside medical implantable devices or used for unattended structural monitoring often are not easily accessible so that batteries cannot be replaced without substantial expense or damage. In the case of an implantable medical device, such as a heart pacemaker implanted within a patient, the replacement of a battery generally requires that an operation be performed at some risk to the patient, and that the entire medical device be replaced at a cost of up to several tens of thousands of dollars. What is needed is a miniature power source which harvests ambient energy to generate electrical power on a sustainable basis.

Previous sources of electrical power based on harvesting mechanical energy have met with limited success due to the small amount of electrical power generated, the low voltage produced, the large size of the device, or a combination of these factors. The present invention represents an advance over the prior art in providing a microelectromechanical (MEM) apparatus which can be used as an electrical power generator, or alternately as a vibration sensor, or as an acceleration or impact sensor. The MEM apparatus of the present invention utilizes a plurality of permanent magnets, which are spaced apart and arranged side-by-side to produce a relatively rapid change in magnetic flux over a small range of displacement, in combination with a meandering (i.e. serpentine) electrical pickup which additively senses the magnetic flux from each of the permanent magnets to generate a relatively large voltage and a relatively large amount of electrical power from a small-sized device.

An advantage of the MEM apparatus of the present invention is that it can be sized, as needed, to produce a predetermined level of electrical power of up to a few milliwatts or more.

Another advantage is that the MEM apparatus of the present invention can be fabricated using conventional micromachining technology so that piece-part assembly can be minimized.

A further advantage of the MEM apparatus of the present invention is that it can be integrated directly on a common substrate with various types of microsystems, microsensors or integrated circuitry to provide electrical power to these devices, or to sense vibration, acceleration or impact.

These and other advantages of the present invention will become evident to those skilled in the art.

SUMMARY OF THE INVENTION

The present invention relates to a microelectromechanical (MEM) apparatus, comprising a meandering electrical pickup disposed on a substrate; and a plurality of permanent magnets spaced apart side-by-side and suspended above the substrate, with the plurality of permanent magnets generating an electrical voltage across the meandering electrical pickup in response to a movement of the plurality of permanent magnets in a direction substantially parallel to a surface of the substrate. The MEM apparatus can further comprise a shuttle for holding the plurality of permanent magnets, with the shuttle being suspended above the substrate by a plurality of springs (e.g. folded springs). Each permanent magnet can comprise a rare-earth permanent magnet (e.g. comprising NdFeB or SmCo).

In certain embodiments of the MEM apparatus of the present invention, the shuttle can comprise a soft-magnetic material (e.g. NiFe, FeCo, NiFeCo or FeAlN). In these embodiments of the present invention, each permanent magnet can have a north-south magnetic pole alignment which is substantially the same, with the soft-magnetic material in the shuttle acting to channel flux lines from the plurality of permanent magnets to effectively form a plurality of oppositely-aligned magnets spaced alternately with the plurality of permanent magnets. A layer of a soft-magnetic material can also be provided on the substrate beneath the meandering electrical pickup for to concentrate and channel the magnetic flux and thereby improve the efficiency of the MEM apparatus.

In other embodiments of the MEM apparatus of the present invention, the plurality of permanent magnets can have an alternating north-south magnetic pole alignment. The provision of an alternating north-south magnetic pole alignment can be performed by inserting each adjacent permanent magnet into the shuttle with an oppositely-directed magnetic pole alignment. In some embodiments of the present invention, the north-south magnetic pole alignment of each permanent magnet can be the same, and subsequent processing can be used to reverse the north-south magnetic pole alignment for every other permanent magnet. This can be done, for example, by providing alternating pairs of the permanent magnets with different Curie temperatures, initially magnetizing the alternating pairs of the permanent magnets with the same north-south magnetic pole alignment, heating the permanent magnets to a temperature which is near the Curie temperature for certain of the permanent magnets while being substantially below the Curie temperature for the remaining permanent magnets, and exposing the permanent magnets to a magnetic field sufficiently strong so as to switch the north-south magnetic pole alignment of those permanent magnets which are heated near their Curie temperature while not altering the north-south magnetic pole alignment of the remaining permanent magnets (i.e. those permanent magnets having the higher Curie temperature). Once the permanent magnets are cooled down, they will retain the same magnetic pole alignment, thereby producing an alternating north-south magnetic pole alignment in the MEM apparatus.

In the various embodiments of the MEM apparatus of present invention above, a resonant frequency of the shuttle and the plurality of permanent magnets can be made substantially equal to a dominant resonant frequency of a vibration which produces the movement of the shuttle. When the MEM apparatus is used as an electrical power generator, this results in more efficient operation; and when the MEM apparatus is used as a vibration sensor, this results in a larger voltage being generated across the meandering electrical pickup.

The present invention further relates to a MEM apparatus which comprises a meandering electrical pickup disposed on a substrate; a shuttle suspended above the substrate and moveable in response to vibrations operatively coupled to the shuttle; and a plurality of permanent magnets supported by the shuttle, with the plurality of permanent magnets producing an electrical voltage in the meandering electrical pickup in response to a movement of the shuttle. The shuttle can be suspended above the substrate by a plurality of springs (e.g. folded springs); and each permanent magnet can comprise a rare-earth permanent magnet. A north-south magnetic pole alignment of each permanent magnet can be aligned substantially parallel to the surface of the substrate, or substantially perpendicular thereto. A resonant frequency of the shuttle and the plurality of permanent magnets supported therein can be made substantially equal to a dominant resonant frequency of the vibrations.

In some embodiments of the MEM apparatus, the shuttle can comprise a soft-magnetic material (e.g. NiFe, FeCo, NiFeCo, FeAlN, etc.). As described above, the provision of a soft-magnetic material for the shuttle allows each permanent magnet to be provided with a north-south magnetic pole alignment which is substantially the same, while the soft-magnetic material effectively forms a plurality of oppositely-aligned magnets which are spaced alternately with the plurality of permanent magnets. In other embodiments of the MEM apparatus, the plurality of permanent magnets can have an alternating north-south magnetic pole alignment. In each of the above embodiments, a soft-magnetic material can optionally be provided on the substrate beneath the meandering electrical pickup.

The present invention is also related to a MEM apparatus comprising a moveable shuttle holding a plurality of elongate permanent magnets arranged side by side, with a substantially identical spacing between adjacent permanent magnets of the plurality of elongate permanent magnets, and a meandering electrical pickup located on each side of the shuttle for generating an electrical voltage in response to a movement of the shuttle and the plurality of elongate permanent magnets.

Each meandering electrical pickup is generally formed on a substrate; and a layer of a soft-magnetic material can be optionally provided on the substrate beneath the meandering electrical pickup. The shuttle can comprise a soft magnetic material, in which case, each permanent magnet can have a north-south magnetic pole alignment which is substantially the same. Alternately, when the shuttle is non-magnetic, the plurality of elongate permanent magnets can have an alternating north-south magnetic pole alignment.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
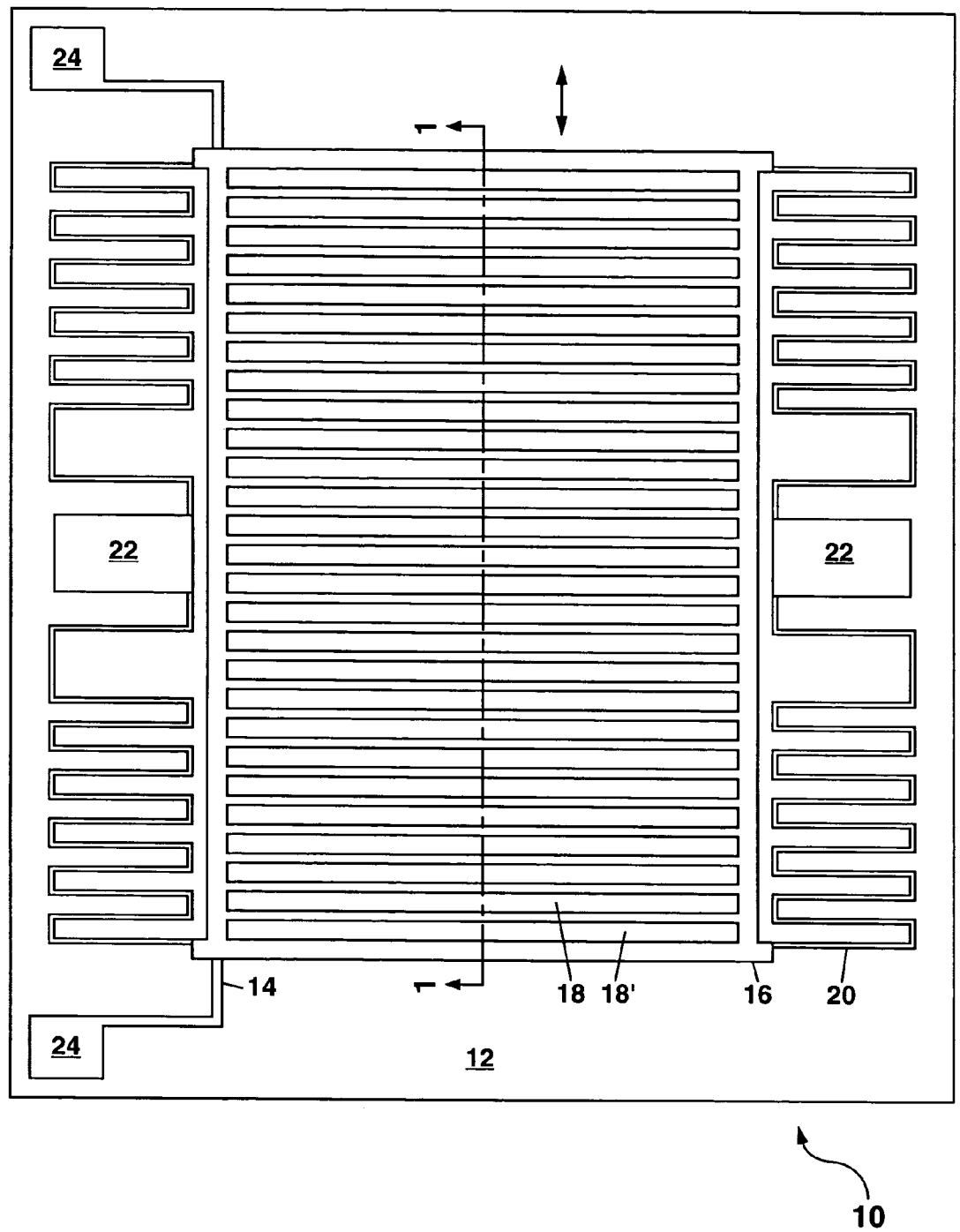
FIG. 1 shows a schematic plan view of a first example of a MEM apparatus formed according to the present invention, with the MEM apparatus being useable as an electrical power generator, as a vibration sensor or as a flux compression generator.

Referring to FIG. 1, there is shown a first example of a microelectromechanical (MEM) apparatus 10 which can be used as an electrical power generator, a vibration sensor, or a flux compression generator. In each case, the MEM apparatus 10 produces a voltage in response to movement of a plurality of permanent magnets therein, with the movement of the permanent magnets being in response to vibration, acceleration or impact.

Figure 2:
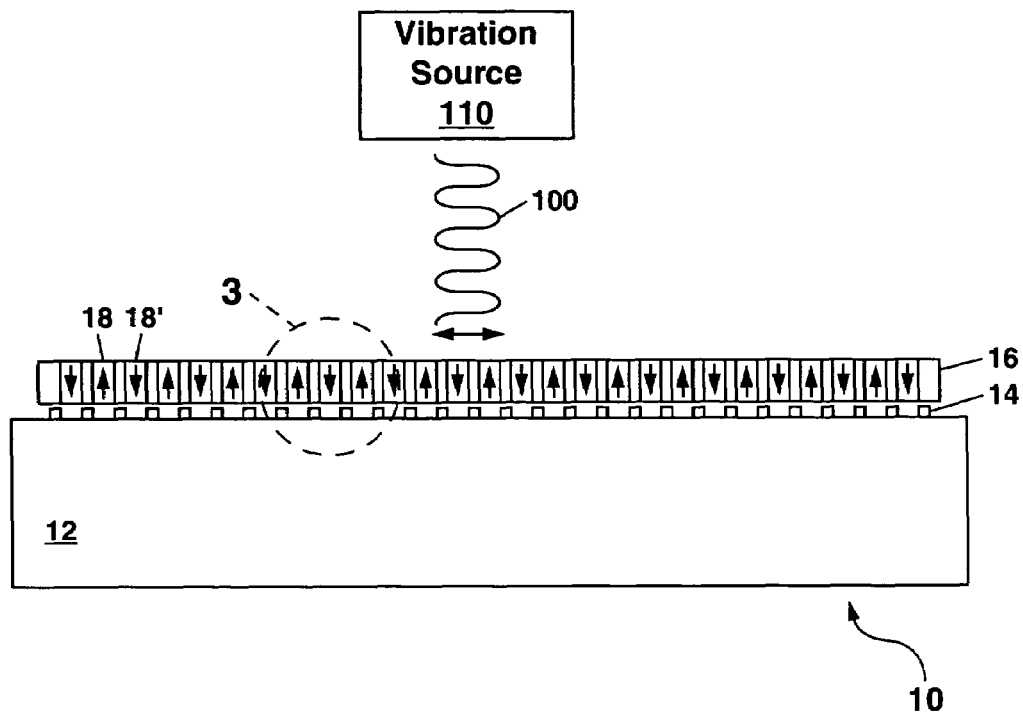
FIG. 2 shows a schematic cross-section view of the MEM apparatus of FIG. 1 along the section line 1—1 in FIG. 1.

The MEM apparatus 10 in FIG. 1 comprises a substrate 12 whereon a meandering electrical pickup 14 is disposed. A moveable shuttle 16 is suspended over the meandering electrical pickup 14, with the shuttle 16 holding a plurality of permanent magnets 18 and 18' arranged side-by-side in a plane with an alternating north-south magnetic pole alignment. The phrase "north-south magnetic pole alignment" defines a line running between a north pole and a south pole of a particular permanent magnet 18 or 18' and further indicates at which end of that line the north pole and south pole are located. Thus, an alternating north-south magnetic pole alignment refers to one permanent magnet 18 having its north pole in a particular direction and an adjacent permanent magnet 18' having its north pole in an opposite direction and so on. In FIG. 2, a vertical arrow is used to indicate the north-south magnetic pole alignment, with the arrow pointing toward the north pole for each magnet 18 and 18'.

In FIG. 1, the permanent magnets 18 and 18' are spaced apart by a predetermined distance which can be about the same as a spacing between turns of the meandering electrical pickup 14, or a multiple thereof. The phrase "turn" used in reference to the meandering electrical pickup 14 refers to a segment of the meandering electrical pickup 14 formed from a pair of relatively long electrical conductors arranged in a direction substantially perpendicular to a direction of motion of the shuttle 16 as indicated by the double-headed arrow in FIG. 1 and a pair of relatively short electrical conductors arranged substantially parallel to the direction of motion of the shuttle 16.

In the example of FIG. 1, the shuttle 16 is suspended above the substrate 12 by a plurality of springs 20 which can be folded to save space. One end of each spring 20 is attached to the shuttle 16, and the other end of each spring 20 can be attached to a support 22 on the substrate 12.

The shuttle 16 is suspended for movement in response to vibrations 100 from an external vibration source 110 as shown in FIG. 2, with the vibrations 100 being operatively coupled to the shuttle 16 to move the shuttle 16 back and forth in a direction substantially parallel to the substrate 12 as indicated by the double-headed arrow. Although the external vibration source 110 is shown located above the MEM apparatus 10 in FIG. 2, the vibration source 110 can be located in any position relative to the MEM apparatus 10 which results in movement of the shuttle 16 in the direction indicated by the double-headed arrow. Generally, when possible the MEM apparatus 10 will be oriented with respect to the external vibration source 110 so as to produce a maximum extent of travel of the shuttle 16 in the back-and-forth direction indicated by the double-headed arrow in FIG. 2.

The external vibration source 110 can be a stationary machine wherein moving parts produce a vibration 100 (e.g. a combustion engine) or wherein external forces produce the vibration 100 (e.g. a bridge vibrating from traffic or wind; a building vibrating from wind or an earthquake; etc.). The external vibration source 110 can also be a moveable machine (e.g. a car, truck, airplane etc.) with a combination of internal (e.g. an engine) and external (e.g. a road, wind or both) sources 110 of vibration. Vibrations 100 from the source can be coupled into the MEM apparatus 10 by direct contact (e.g. by attaching the MEM apparatus 10 to the vibration source 110 or to anything mechanically connected to the vibration source 110) or by indirect contact (e.g. by coupling of the vibrations 100 through the air as sound, or through water, earth, etc.).

The MEM apparatus 10 of the present invention, when used as an electrical power generator can be used to generate an alternating-current (ac) voltage which can be rectified and converted to a direct-current (dc) voltage for use in powering integrated circuitry, sensors or other MEM devices which can be formed on a common substrate 12 together with the apparatus 10, or located in a common package therewith. The MEM apparatus 10 can also be used as a vibration sensor to generate an electrical output voltage to indicate the presence and magnitude of external vibrations 100 coupled into the apparatus 10. The MEM apparatus 10 can further be used as a flux compression generator to generate a large voltage pulse in response to a rapid acceleration or deceleration. Such a large voltage pulse could be used, for example, to trigger an automobile airbag in response to a collision.

As the shuttle 16 in the MEM apparatus 10 is urged to move in response to vibrations 100 from the external source 110 coupled to the apparatus 10, the various permanent magnets 18 and 18' in the shuttle 16 move relative to the turns of the meandering electrical pickup 14. This motion of the permanent magnets 18 and 18' induces an electrical voltage, V, in the pickup 14 which is proportional to a rate of change of a magnetic flux, φ, produced by according to Faraday's Law:

$$V = -N\frac{d\phi}{dt} = -N\frac{d\phi}{dx}\frac{dx}{dt} = -N\frac{d\phi}{dx}v \qquad \text{Eq. 1}$$

In Equation 1 above, N is the number of turns in the meandering electrical pickup 14, dφ/dx is the rate of change in the magnetic flux φ with distance x of the shuttle 16 and v is a velocity of movement of the shuttle 16 which is related to the frequency of the vibrations 100 (e.g. a few Hertz to a few kiloHertz) responsible for movement of the shuttle 16. By providing the plurality of permanent magnets 18 and 18' with an alternating north-south magnetic pole alignment as shown in the schematic cross-section view of FIG. 2, the rate of change of the magnetic flux with distance (i.e. dφ/dx) can be maximized since a full cycle in magnetic flux variation will occur each time the shuttle 16 moves over a distance equal to the spacing between each adjacent pair of the permanent magnets 18 and 18'.

Figure 3:
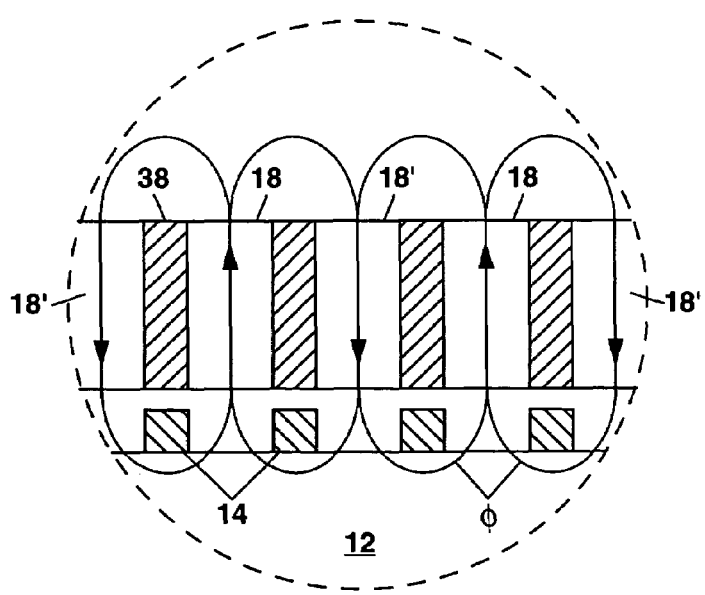
FIG. 3 shows an enlarged cross-section view of a portion of the MEM apparatus of FIGS. 1 and 2 to illustrate lines of magnetic flux $\phi$ coupled from the permanent magnets to an underlying meandering electrical pickup to produce an electrical voltage therein in response to a vibration-induced movement of the permanent magnets and supporting shuttle.

FIG. 3 is an enlarged partial view of a portion of the MEM apparatus 10 in FIG. 2 to show lines of the magnetic flux φ (indicated by the closed paths with an arrow pointing towards a north pole of the magnet, and with a south pole of the magnet being in the opposite direction) which are produced by the permanent magnets 18 and 18' for coupling to the meandering electrical pickup 14 for generating the electrical voltage, V, therein. Although the arrows in FIGS. 2 and 3 are vertically oriented to show a north-south magnetic pole alignment that is substantially perpendicular to the plane of the substrate 12, those skilled in the art will understand that the north-south magnetic pole alignment can also be substantially parallel to the plane of the substrate 12, or at any angle relative to the substrate 12 so long as the lines of the magnetic flux φ pass around the turns of the meandering electrical pickup 14 as shown in FIG. 3.

In the example of FIG. 1, the springs 20 can be made with a high aspect ratio of height to width (e.g. about 5:1 to 10:1 or more) so that the springs 20 will allow the shuttle 16 and attached magnets 18 and 18' to move relatively freely in a direction substantially parallel to the surface of the substrate 12 in the direction shown by the double-headed arrow in FIGS. 1 and 2 while resisting motion in a direction substantially perpendicular to the surface of the substrate 12. The supports 22 also resist motion in the plane of the substrate in a direction normal to that of the double-headed arrow in FIG. 1. The shuttle 16 can have lateral dimensions of, for example, 1–3 centimeters on a side and can be, for example, 50–500 μm thick, with the springs 20 generally being the same thickness of the shuttle 16 and being, for example, 25 μm wide.

Figure 4:
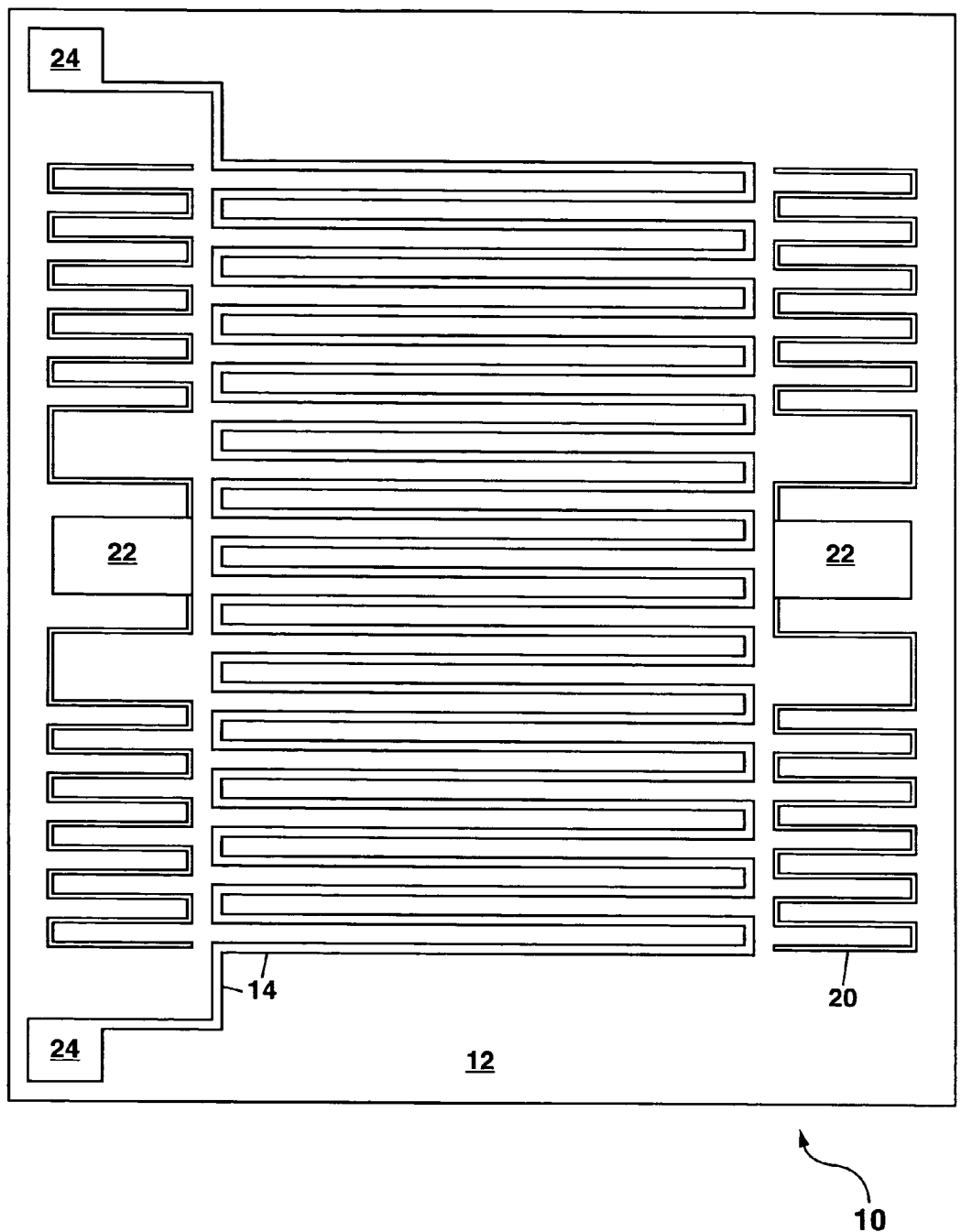
FIG. 4 shows a schematic plan view of the apparatus of FIG. 1 with the shuttle and permanent magnets removed to show the underlying meandering electrical pickup.

FIG. 4 shows a schematic plan view of the MEM apparatus 10 of FIG. 1 with the shuttle 16 removed to show the underlying meandering electrical pickup 14. The meandering electrical pickup 14 can comprise an electrical conductor having lateral dimensions of, for example, 1–10 μm thickness and 10–25 μm width, with each turn of the pickup 14 being spaced from an adjacent turn by, for example, 50 μm. The meandering electrical pickup 14 can be connected to a contact pad 24 at either end thereof as shown in FIG. 4 for attaching external wires (not shown) to the MEM apparatus 10. In other embodiments of the present invention, a plurality of meandering electrical pickups 14 can be formed on the substrate 12 in a nested (i.e. interleaved or stacked) arrangement, with the nested pickups 14 being electrically interconnected in series to provide an increased voltage, or being interconnected in parallel to provide an increased current.

The MEM apparatus 10 of FIG. 1 can be formed as described hereinafter with reference to FIGS. 5A–5K.

Figure 5A:
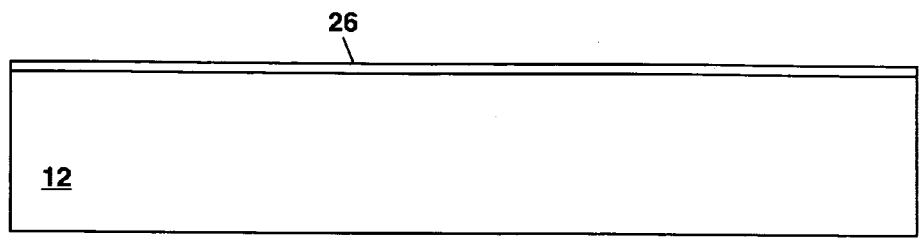
FIGS. 5A–5K illustrate fabrication of the MEM apparatus of FIG. 1 using a series of LIGA process steps.
Figure 5B:
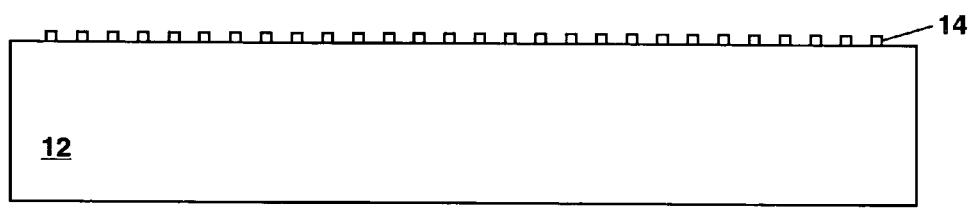

In FIGS. 5A and 5B, the meandering electrical pickup 14 can be formed on the substrate 12. The shuttle 16, permanent magnets 18 and 18', springs 20 and supports 22 in this example of the present invention are formed separately and subsequently attached to the substrate 12 to complete the MEM apparatus 10.

When the substrate 12 is electrically insulating (e.g. comprising glass, ceramic, fused silica, quartz, printed-circuit board material, etc.), the pickup 14 can be formed directly on the substrate 12. Alternately, when the substrate 12 is electrically conducting (e.g. comprising a metal, metal alloy or a semiconductor material such as silicon), an electrically-insulating layer (e.g. comprising silicon dioxide, silicon nitride, aluminum oxide, a polymer, a silicate glass or a spin-on glass) can be blanket deposited over the substrate 12 to electrically insulate the pickup 14 from the substrate 12.

In FIG. 5A, an electrically-conducting layer 26 (e.g. comprising a metal or metal alloy which further comprises copper, aluminum, gold, silver, platinum, palladium, etc.; or comprising a doped semiconductor such as doped polycrystalline silicon) can be provided as a full-surface layer 26 covering the substrate 12 with a thickness of, for example, 10 μm. The electrically-conductive layer 26 can then be patterned by etching as shown in FIG. 5B to form the meandering electrical pickup 14 and contact pads 24 on the substrate 12.

As an example, to form the meandering electrical pickup 14 on a substrate 12 comprising a printed-circuit board, a conventional printed-circuit board can be obtained with a full-surface layer 26 of copper about 10 μm thick on at least one side thereof. A photoresist mask can then be photolithographically defined over areas of the copper layer 26 that are to be retained and used for forming the meandering electrical pickup 14 and contact pads 24; and the remainder of the copper layer 26 can be removed using a conventional printed-circuit board etchant solution.

As another example, when the substrate 12 comprises glass or quartz, an electrically-conductive layer 26 of a metal, metal alloy or doped polycrystalline silicon (e.g. doped to about $10^{18}$ cm$^{-3}$ or more with boron or phosphorous) can be blanket deposited over the substrate 12 as shown in FIG. 5A using evaporation, sputtering, or chemical vapor deposition. In some instances a thin (e.g. 200–1000 nm) seed layer can be initially blanked deposited over the substrate 12; and then a thicker (e.g. up to 10 μm) electrically-conductive layer can be plated over the seed layer to build-up a predetermined thickness of the electrically-conductive layer 26. A photolithographically-defined mask can then be formed over the electrically-conductive layer 26 using well-known integrated circuit processing technology to define the shape of the meandering electrical pickup 14 and contact pads 24. The remainder of the electrically-conductive layer 26 not protected by the mask can then be etched away as shown in FIG. 5B.

As yet another example, a low-temperature co-fired ceramic (LTCC) substrate 12 in a "green" state can be provided with the meandering electrical pickup 14 and the contact pads 24 being formed thereon by screen printing a metal paste (e.g. comprising silver). This substrate 12 can then be heated at an elevated temperature (e.g. ≧800° C.) to co-fire the ceramic and sinter the metal paste, and also to remove any organic binders or plasticizers used in the metal paste.

In FIGS. 5C–5J, the shuttle 16, permanent magnets 18 and 18', springs 20 and supports 22 can be formed separately on a sacrificial substrate 28 by a series of LIGA process steps as described hereinafter.

Figure 5C:
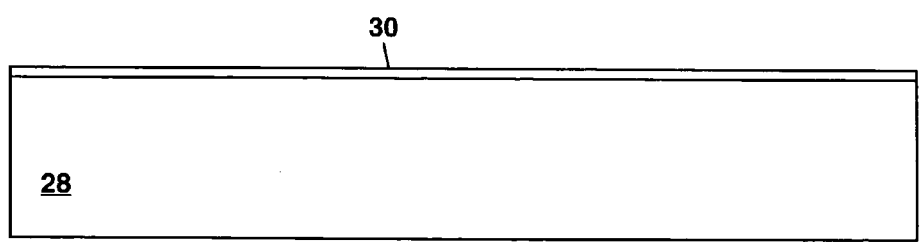

In FIG. 5C, a sacrificial substrate 28 can be provided with a sacrificial layer 30 formed thereon. As an example, the sacrificial substrate 28 can comprise alumina, nickel or silicon; and the sacrificial layer 30 can comprise copper about 1 μm thick which has been deposited or electroplated over the entire surface of the substrate 28. As another example, the sacrificial substrate 28 can comprise copper, nickel or silicon; and the sacrificial layer 30 can comprise an electrically-conductive polymer such as polymethymethacrylate (PMMA) loaded with 60–70 wt-% silver particles.

Figure 5D:
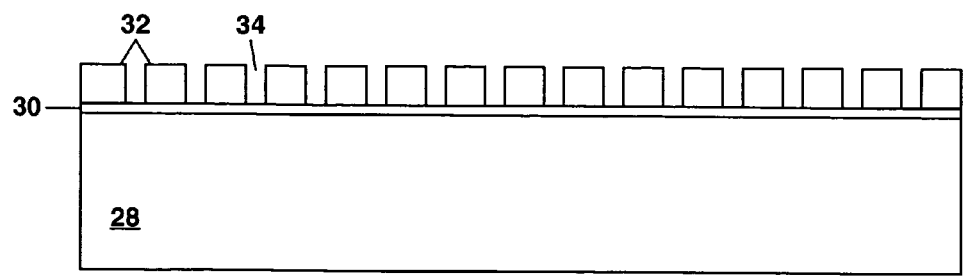

In FIG. 5D, a mask 32 can be formed over the sacrificial substrate 28. The mask 32 can comprise, for example, PMMA which can be exposed by deep x-ray lithography (e.g. using a synchrotron deep x-ray source) and then developed to define a pattern for the mask 32, with openings 34 in the mask 32 at the locations wherein the shuttle 16, springs 20 and supports 22 are to be formed. The mask 32 preferably has a thickness that is substantially equal to or greater than the thickness of the various elements 16, 20 and 22 being formed on the sacrificial substrate 28. As an example, the thickness of the mask 32 can be in the range of 50–500 μm. The width of the openings 34 for the shuttle 16 can be, for example, 50–100 μm; and the width of the openings 34 for the springs 20 can be about 25 μm wide, for example.

Figure 5E:
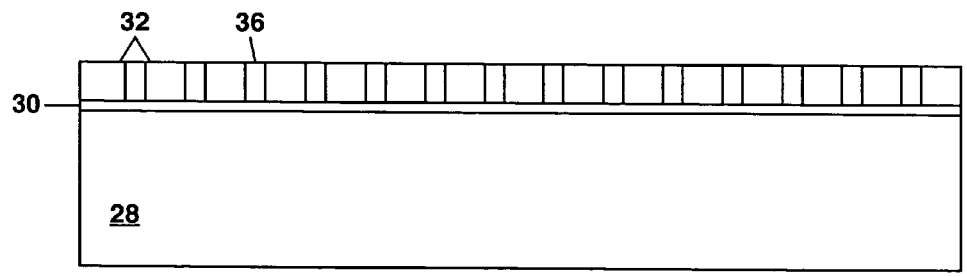

In FIG. 5E, a soft-magnetic material 36 such as nickel (Ni), nickel-iron (NiFe), iron-cobalt (FeCo), or nickel-iron-cobalt (NiFeCo) can be electroplated to fill in the openings 34 in the mask 32 for use in forming the shuttle 16, the springs 20 and the supports 22. In this example of the present invention, the soft-magnetic material will also be used to form the permanent magnets 18'. In other embodiments of the present invention a non-magnetic material can be substituted for the soft-magnetic material 36 in forming the shuttle 16, springs 20 and supports 22.

Figure 5F:
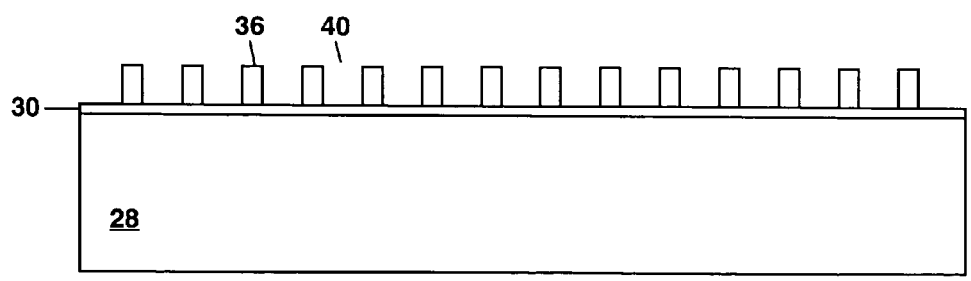
Figure 5G:
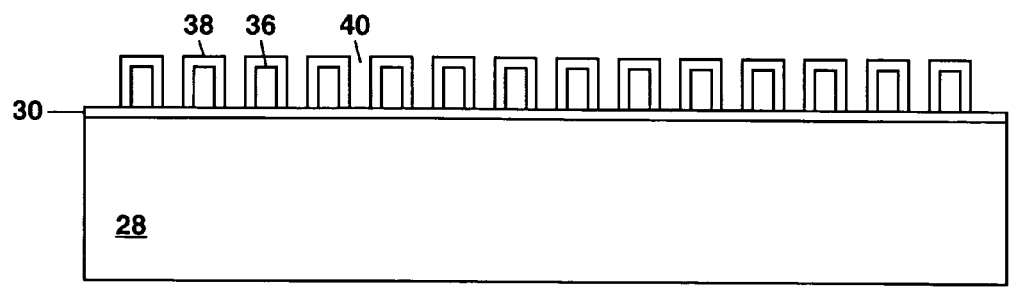
Figure 5H:
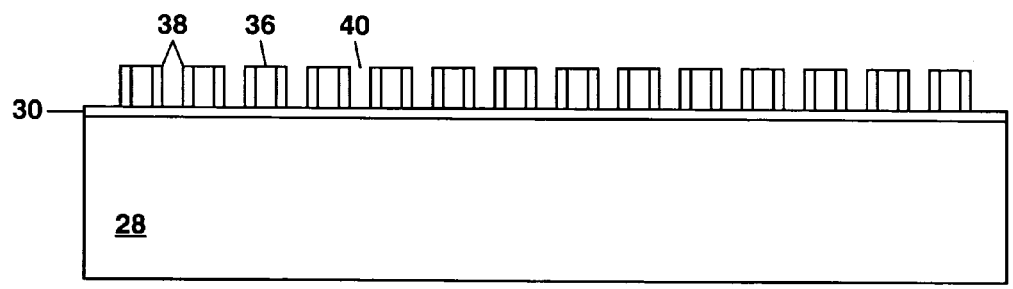

In FIG. 5F, the mask 32 can be removed by with a solvent (e.g. acetone) to leave the soft-magnetic material 36 in place on the substrate, with portions of the soft-magnetic material 36 being separated by slots 40. In FIG. 5G, a non-magnetic material 38 (e.g. tungsten, platinum, copper, beryllium-copper, etc.) can be electroplated over the soft-magnetic material 36 to a layer thickness of, for example 25 µm. Electroplating of the soft-magnetic material 36 at the bottom of the slots 40 can be prevented by not completely removing the mask 32 from the bottom of the slots 40, or alternately by depositing a thin electrically-insulating layer (e.g. photoresist) at this location. The non-magnetic material 38 is advantageous for extending the lines of magnetic flux $\phi$ from the permanent magnets 18 down beyond the shuttle 16 and into the vicinity of the meandering electrical pickup 14 as shown in FIG. 3. In FIG. 5H, a portion of the non-magnetic material 38 extending above the soft-magnetic material 38 can be removed by a mechanical or chemical-mechanical polishing step.

In the event that the soft-magnetic material 38 is deposited at the bottom of the slots 40, this material 38 can be removed by a further polishing step after the shuttle 16 with the attached permanent magnets 18 and 18', springs 20 and supports 22 has been formed as a shuttle assembly 44 and removed from the sacrificial substrate 28 by etching or dissolving away the sacrificial layer 30. For this further polishing step, the shuttle assembly 44 can be temporarily attached upside down to a support substrate.

Figure 5I:
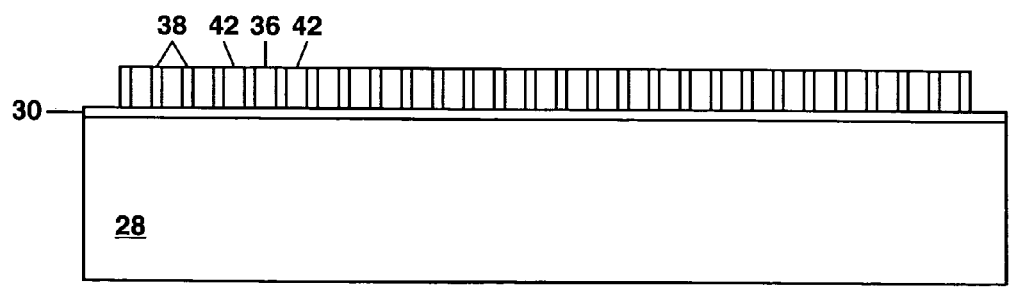

In FIG. 5I, a rare-earth magnetic material 42 can be deposited to fill up each slot 40 between the soft-magnetic material 36. The rare-earth magnetic material 42 can comprise neodymium-iron-boron (NdFeB) or samarium-cobalt (SmCo) rapidly-quenched powder with a sub-micron grain size. The rare-earth magnetic material 42 in an unmagnetized state can be mixed with a binder material (e.g. epoxy or a polymer) and then filled into the slots 40. This can be done by many different well-known processes including calendering, doctor-blading, pressing, squeegeeing, injection molding etc. as disclosed by Christenson in U.S. Pat. No. 6,375,759 which is incorporated herein by reference.

Once in place, the rare-earth magnetic material 42 can then be hardened (e.g. by a curing, sintering or thermosetting step). Any of the rare-earth magnetic material 42 extending upward beyond the height of the soft-magnetic material 36 can then be removed by another polishing step. The rare-earth magnetic material 42 can be magnetized to saturation using a high magnetic field (e.g. a pulsed magnetic field). This forms a plurality of rare-earth permanent magnets 18 each having a north-south magnetic pole alignment which is directed substantially perpendicular to the substrate 28 as indicated by the upward-pointing arrows in FIG. 5J. An energy product BH for each rare-earth permanent magnet 18 can be, for example, about 10 MegaGauss-Oersted (MGOe).

Figure 5J:
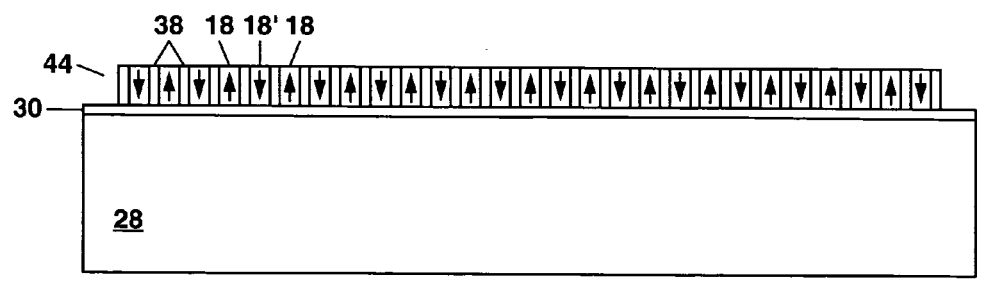

The soft-magnetic material 36 adjacent to each rare-earth permanent magnet 18 is magnetized by the lines of magnetic flux $\phi$ from the rare-earth permanent magnets 18 which pass through the soft-magnetic material 36 in a direction (indicated by the downward-pointing arrows in FIG. 5J, and as shown in FIG. 3) that is opposite that of the adjacent rare-earth permanent magnets 18. Due to the continued presence of the rare-earth permanent magnets 18 located in the MEM apparatus 10, the soft-magnetic material 36 remains in a magnetized state and is considered for the purposes of this example of the present invention as forming the oppositely-directed permanent magnets 18'. The net result in FIG. 5J is a series of permanent magnets 18 and 18' having an alternating north-south magnetic pole alignment with a magnetic flux reversal on a distance scale substantially equal to the distance between adjacent turns of the meandering electrical pickup 14 (see also FIG. 3). This spacing can be about 50–100 µm, for example.

In other embodiments of the present invention, pre-formed rare-earth permanent magnets 18 and 18' can be plated into the slots 40, mechanically pressed into the slots 40 or attached therein by an adhesive (e.g. epoxy), with the permanent magnets 18 and 18' having an alternating north-south magnetic pole alignment. In yet other embodiments of the present invention, a plurality of permanent magnets can be formed in place with an alternating north-south magnetic pole alignment as will be described hereinafter.

Figure 5K:
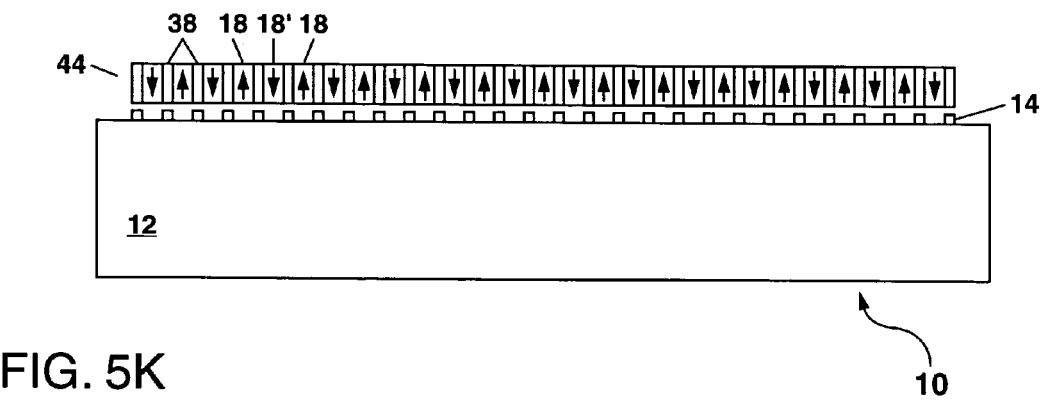

After the shuttle 16 with the attached permanent magnets 18 and 18', springs 20 and supports 22 has been formed as an assembly 44 on the sacrificial substrate 28, this shuttle assembly 44 can be separated from the substrate 28 and attached to the substrate 12 as shown in FIG. 5K to form the MEM apparatus 10. The attachment of the shuttle assembly 44 to the substrate 12 can be performed either prior to or after removal of the sacrificial substrate 28 by using a selective etching or solvent dissolution step to remove the sacrificial layer 30 and thereby release the shuttle assembly 44 from the sacrificial substrate 28. Attachment of the shuttle assembly 44 to the substrate 12 via the support posts 22 can be made using a plurality of pins and/or screws, or alternately using solder, epoxy, or diffusion bonding, with the mode of attachment generally depending upon the exact composition of the substrate 12 and the material used for forming the supports 22. The spacing between the shuttle 16 and permanent magnets 18 and 18' and the meandering electrical pickup 14 in the completed MEM apparatus 10 can be, for example, 7 µm.

Since the generated electrical power scales up as the square of the voltage across the meandering electrical pickup 14 and hence as the square of the velocity, v, of the shuttle 16 from Equation 1, the generated electrical power can be substantially increased by operating the MEM apparatus 10 at a resonant frequency that is substantially equal to a dominant resonant frequency of a particular vibration environment (i.e. a particular vibration source 110). Operating at resonance maximizes the distance over which the shuttle 16 moves back and forth for each cycle of the dominant resonant frequency of the vibration 100 and thereby maximizes the velocity of the shuttle 16. The mass of the shuttle 16 and attached magnets 18 and 18' and a spring constant for the springs 20 can be selected so that the resonant frequency of the MEM apparatus 10 matches the dominant resonant frequency of the vibration environment. When the MEM apparatus 10 is used as a vibration sensor, matching the resonant frequency to the dominant resonant frequency of a particular vibration 100 will increase the voltage generated across the pickup 14 which provides an output signal for the vibration sensor 10. It is expected that the MEM apparatus 10 will be capable of producing up to several milliWatts of electrical power when operating at resonance.

In some embodiments of the present invention, a plurality of meandering electrical pickups 14 can be stacked one upon the other with a thin (e.g. about 200 nm) layer of electrical insulation (e.g. silicon nitride, silicon dioxide, a silicate glass such as a TEOS-deposited silicate glass, a spin-on glass or a polymer) separating adjacent of the stacked pickups 14. Each stacked electrical pickup 14, which can have an electrical conductor that is, for example, 1–2 μm thick and a few μm wide, can be connected to a pair of contact pads 24 so that the pickups 14 can be externally wired in series or parallel to provide a predetermined level of voltage or current from the MEM apparatus 10. Alternately, electrical wiring can be provided on the substrate 12 to provide a predetermined series or parallel connection of the stacked pickups 14. The use of multiple stacked pickups 14 in a series configuration is advantageous for providing a higher output voltage than could be achieved using only a single meandering electrical pickup 14. In this way, it is expected that the output voltage can be increased to, for example, 5–10 volts which is sufficient to drive other integrated circuitry, or other types of MEM devices or both that can be provided on the same substrate 12. For optimal power transfer to a load, the electrical resistance of the meandering electrical pickup 14 can be matched to the resistance of the load.

In other embodiments of the present invention, a plurality of meandering electrical pickups 14 can be interleaved so that a plurality of turns are nested together. The nested turns can be interconnected in series to provide an increased output voltage. This can be done, for example, by forming a plurality of electrically-conductive vias to electrically connect each turn of the pickup 14 to an underlying interconnection layer which can be used to provide a series connection of the nested turns.

Figure 6:
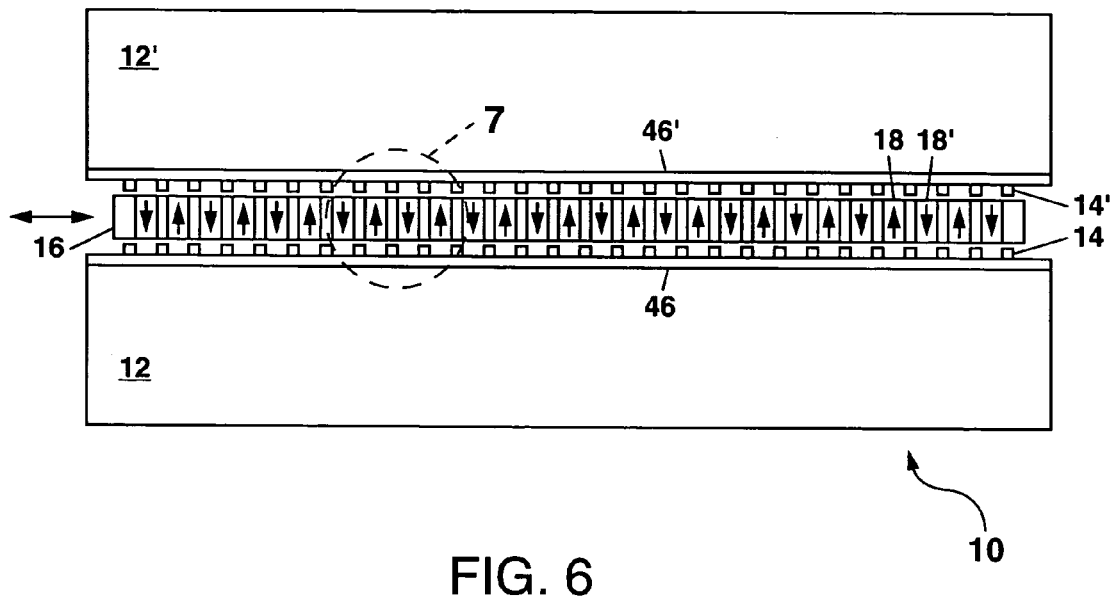
FIG. 6 shows a schematic cross-section view of a second example of the MEM apparatus of the present invention.

FIG. 6 shows a schematic cross-section view of a second example of the MEM apparatus 10 of the present invention which can be fabricated in a manner similar to that described previously with reference to FIGS. 5A–5K except for having a second substrate 12' with a meandering electrical pickup 14' that is inverted over the shuttle assembly 44 and attached to the substrate 12 by a plurality of standoffs (not shown). In the example of FIG. 6, the direction of motion of the shuttle 16 due to a sensed vibration is indicated by the double-headed arrow. The provision of two meandering electrical pickups 14 and 14' in the apparatus 10 can double the generated electrical power and voltage. The generated electrical power can also be scaled up linearly with an overall area of the shuttle 16 and permanent magnets 18 and 18' and the meandering electrical pickups 14 and 14' when the dimensions and spacing of the permanent magnets 18 and 18' are fixed.

A substantial further increase in the generated electrical power and voltage can be provided in the MEM apparatus 10 of FIG. 6 by including a soft-magnetic layer 46 or 46' beneath each meandering electrical pickup 14 or 14' on the substrate 12 or 12'. The soft-magnetic layers 46 and 46' concentrate and channel the magnetic flux φ as shown in the enlarged partial cross-section view of FIG. 7 thereby increasing an electrical inductance of the meandering electrical pickup 14 by increasing the magnetic flux φ linking each turn in the pickup 14. This increased inductance of the pickup 14 allows a larger voltage V to be generated therein, thereby increasing the power generation efficiency of the MEM apparatus 10. Calculations show that the magnetic flux concentration provided by the soft-magnetic layers 46 and 46' in the MEM apparatus 10 of FIGS. 6 and 7 can provide up to a three-fold increase in electrical power generation compared to the same device 10 without the soft-magnetic layers 46 and 46'.

Figure 7:
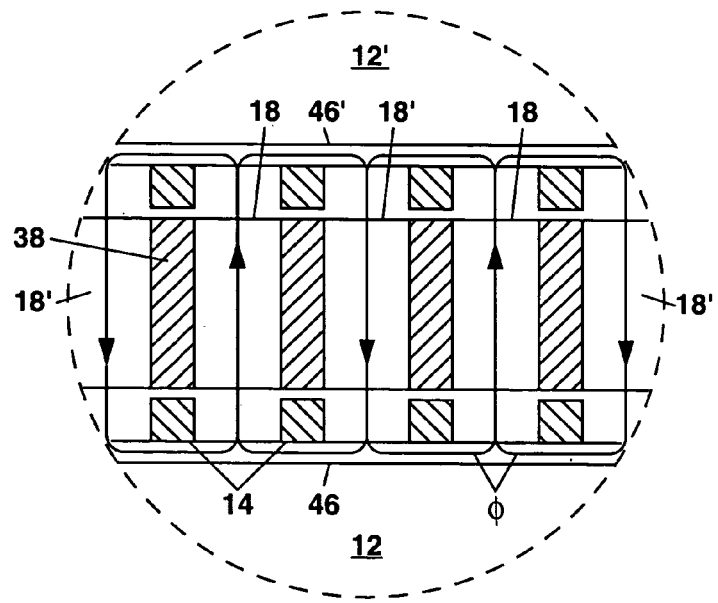
FIG. 7 shows an enlarged partial cross-section view of a portion of the MEM apparatus of FIG. 6 to show details therein including a channeling of the lines of magnetic flux $\phi$ produced by a soft-magnetic layer provided between each meandering electrical pickup and a supporting substrate.

In the example of FIGS. 6 and 7, the soft-magnetic layers 46 and 46' can comprise, for example, NiFe, FeCo, NiFeCo, iron-aluminum-nitride (FeAlN), or any other soft-magnetic material known to the art with a layer thickness of up to a few μm. The soft-magnetic layers 46 and 46' can be separated from each meandering electrical pickup 14 or 14' by a thin electrically-insulating layer (e.g. silicon nitride, silicon dioxide, a polymer, silicate glass or spin-on glass with a layer thickness of a few hundred nanometers). Deposition of the soft-magnetic layers 46 and 46' can be performed using evaporation, sputtering, or electroplating. Any magnetic force of attraction between the permanent magnets 18 and 18' and the soft-magnetic layers 46 and 46' can be substantially reduced by including one of the soft-magnetic layers 46 and 46' on each side of the shuttle 16.

The soft-magnetic layers 46 and 46' can also produce an increased damping of the shuttle 16 in the back-and-forth direction indicated by the double-headed arrow in FIG. 6 due to eddy currents generated therein. This damping can be reduced by reducing the thickness of the soft-magnetic layers 46 and 46' to less than a skin depth, by increasing an electrical resistivity of the layers 46 and 46', or by laminating a plurality of the soft-magnetic layers 46 and 46' together separated by thin (20–200 nm) electrically-insulating layers.

In other embodiments of the present invention, a plurality of MEM devices 10 can be batch fabricated on a common substrate 12 and electrically connected together in series or in parallel to provide an even higher electrical output power. By electrically connecting a plurality of the MEM devices 10 in parallel, a redundancy can be provided to protect against the failure of certain of the MEM devices 10 thereby permitting a long operating life with unattended operation. The shuttles 16 can also be optionally interconnected via linkages to so that the shuttles 16 all operate in phase.

Figure 8:
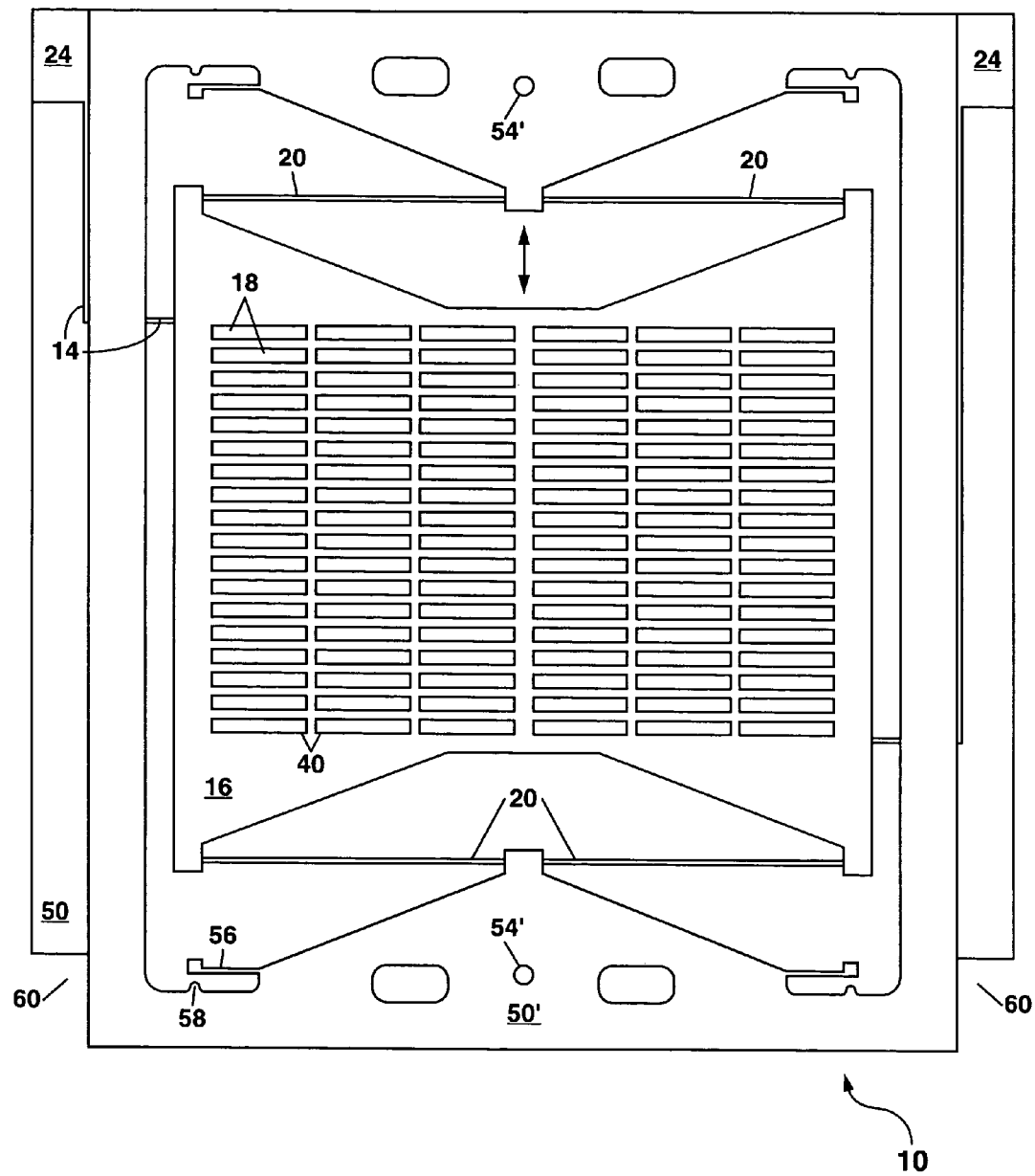
FIG. 8 shows a schematic plan view of a third example of the MEM apparatus of the present invention fabricated using micromachining.

FIG. 8 shows a plan view of a third example of the MEM apparatus 10 of the present invention. This example of the present invention can be fabricated using bulk micromachining. The MEM apparatus 10 of FIG. 8 comprises a pair of substrates 50 and 50' stacked one upon the other and attached together. Although this example will be described with reference to micromachining of silicon substrates 50 and 50', those skilled in the art will understand that the substrates 50 and 50' can comprise other micromachineable materials including semiconductors, glass, fused silica, quartz, ceramic, metal and metal alloys.

Figure 9:
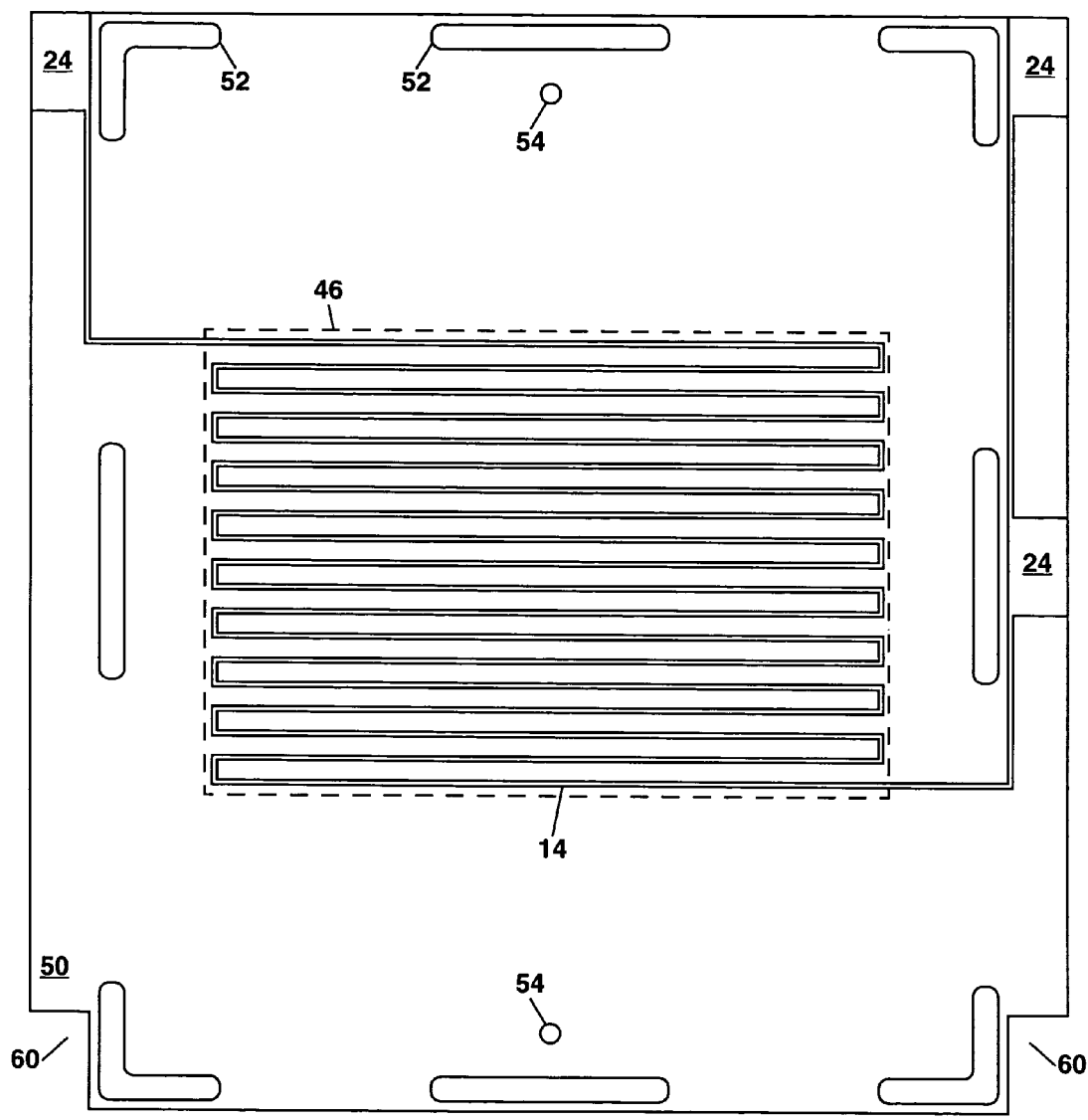
FIG. 9 shows a schematic plan view of the meandering electrical pickup formed on one substrate which can be attached to a second substrate to form the MEM apparatus of FIG. 8.

A first substrate 50, which is shown in the schematic plan view of FIG. 9, has a meandering electrical pickup 14 formed thereupon, with the meandering electrical pickup 14 being connected at each end thereof to at least one contact pad 24. This substrate 50 can be, for example, about 14 millimeters square. An optional soft-magnetic layer 46 can be provided on the substrate 50 beneath the meandering electrical pickup 14 as previously described with reference to FIGS. 6 and 7. The location of the optional soft-magnetic layer 46 is indicated by the dashed rectangular outline in FIG. 9.

A photolithographically-defined mask (not shown) can be provided on the substrate 50 at the locations of a plurality of spacers 52 to be formed for precisely separating the shuttle 16 on the substrate 50' from the meandering electrical trace 14 on the substrate 50 when these two substrates 50 and 50' are attached together. Exposed portions of a topside of the substrate 50 not protected by the mask can then be etched downward (e.g. by reactive ion etching) to a predetermined depth of a few microns (e.g. 5–20 μm). In other embodiments of the present invention, the spacers 52 can be formed from one or more layers of polycrystalline silicon (also termed polysilicon) which are deposited on the topside of the substrate 50 and patterned by an etching step. The polysilicon can be deposited by low-pressure chemical vapor deposition (LPCVD) at a temperature of about 580° C.

A further etching step from either the topside or a backside of the substrate 50 can then be used to form a plurality of through-holes 54 which are useful for precisely aligning the two substrates 50 and 50' prior to attaching the substrates together. For this purpose, a pin can be temporarily or permanently inserted through each through-hole 54 in the first substrate 50 and through another through-hole 54' formed in the second substrate 50'.

Etching of the through-holes 54 and 54' and etching through the substrate 50' as described hereinafter to form the shuttle 16, springs 20 and other elements on the substrate 50' can be performed using a deep reactive ion etch (DRIE) process such as that disclosed in U.S. Pat. No. 5,501,893 to Laermer, which is incorporated herein by reference. The DRIE process for bulk micromachining of certain elements of the MEM apparatus 10 utilizes an iterative Inductively Coupled Plasma (ICP) deposition and etch cycle wherein a polymer etch inhibitor is conformally deposited as a film over the semiconductor wafer during a deposition cycle and subsequently removed during an etching cycle. The DRIE process for bulk micromachining produces substantially vertical sidewalls with little or no tapering for the through-holes 54 and 54' and for the various elements being formed on the second substrate 50'.

To electrically insulate the meandering electrical pickup 14 from the substrate 50, an electrically-insulating layer can be formed over the substrate 14. The electrically-insulating layer can comprise, for example, a layer of thermal oxide (about 600 nanometers thick) formed by a conventional wet oxidation process at an elevated temperature (e.g. 1050° C. for about 1.5 hours) and an overlying layer of low-stress silicon nitride (e.g. 800 nanometers thick) deposited using low-pressure chemical vapor deposition (LPCVD) at about 850° C.

In FIG. 9, the meandering electrical pickup 14 can comprise a patterned layer of doped polysilicon or metal with a thickness, for example, of 1–2 μm and with a width of a few μm or more (e.g. 5–25 μm). As previously discussed, in certain embodiments of the present invention, a plurality of meandering electrical pickups 14 can be formed stacked one upon the other or interleaved, and interconnected in a series or parallel arrangement. Although the meandering electrical pickup 14 is shown in FIG. 9 with a size about that of the plurality of permanent magnets 18 in FIG. 8, in other embodiments of the present invention, the meandering electrical pickup 14 can be extended over an entire range of back and forth travel of the shuttle 16 and permanent magnets 18 (i.e. from the pair of springs 20 at the top of FIG. 8 to the pair of springs 20 at the bottom of FIG. 8).

The second substrate 50' can be bulk micromachined to form the shuttle 16, springs 20 and other elements from the substrate material. This can be done using one or more DRIE steps as previously described. A first DRIE step can be used to form a plurality of slots 40 extending across a portion of the width of the shuttle 16 as shown in FIG. 8. A plurality of permanent magnets 18 can then be formed in the slots 18 as described hereinafter and covered with a lithographically-defined mask in preparation for a second DRIE step which is used to form the through-holes 54', the shuttle 16, springs 20, and other elements of the MEM apparatus 10 being formed from the substrate 50'. The shuttle 16 and springs 20 are generally of the same thickness as the substrate 50' (e.g. about 100–500 μm), with each spring 20 being, for example, 25 μm wide.

In FIG. 8, between the first and second DRIE steps, the permanent magnets 18 can be formed in the shuttle 16. This can be done as previously described by filling the slots 40 with a mixture of a rare-earth magnetic material 42 which is then hardened in place. By providing the permanent magnets 18 in a two-dimensional array of rows and columns as shown in FIG. 8, the structural stability of the shuttle 16 can be enhanced. In other embodiments of the present invention, the MEM apparatus 10 of FIG. 8 can be fabricated with a plurality of permanent magnets 18 extending across a majority of the width of the shuttle 16 in a manner similar to that of the first example of the present invention in FIG. 1.

In yet other embodiments of the present invention, a soft-magnetic material (e.g. NiFe, FeCo or NiFeCo) can be deposited (e.g. by electroplating) in every other slot 40 in each column of slots 40 in FIG. 8, with the remaining slots being filled with the rare-earth material 42 (e.g. NdFeB or SmCo). The rare-earth permanent magnets 18 will then permanently magnetize the soft-magnetic material as previously described with reference to FIGS. 2 and 3 to form a plurality of permanent magnets 18' which will have a north-south magnetic pole alignment that is opposite that of the rare-earth permanent magnets 18.

When the soft-magnetic material as described above is not used, an alternating north-south magnetic pole alignment can be provided in the MEM apparatus 10 of FIG. 8 by filling alternating rows of the slots 40 with two different rare-earth magnetic materials 42 to provide a plurality of alternating pairs of permanent magnets 18 with different Curie temperatures. The difference in Curie temperatures for the two different rare-earth magnetic materials 42 can then be used to alter an initial magnetization state of certain of the permanent magnets 18 having a lower Curie temperature while not substantially affecting the magnetization state of the remaining permanent magnets 18 having a higher Curie temperature. As an example, one permanent magnet in each alternating pair of the permanent magnets 18 can comprise a NdFeB rare-earth permanent magnet with a Curie temperature which can be in a range of about 310–365° C.; and the other permanent magnet in each alternating pair of the permanent magnets 18 can comprise a SmCo rare-earth permanent magnet with a Curie temperature $T_C$ in a range of about 720–800° C. Those skilled in the art will understand that many different material compositions are available for NdFeB and SmCo rare-earth permanent magnets, and that the Curie temperature will vary depending upon a particular material composition and whether the rare-earth permanent magnets 18 are bonded or sintered. Furthermore, the terms "NdFeB" and "SmCo" as used herein refer to rare-earth permanent magnets having the named elements therein, but which can contain up to about 10% by weight of other elements.

A thermally-assisted magnetic field switching method, which utilizes the difference in Curie temperatures $T_C$ for the alternating pairs of permanent magnets 18, can then be used to selectively magnetize the SmCo permanent magnets 18 with one north-south magnetic pole alignment and to selectively magnetize the NdFeB permanent magnets 18 with an opposite north-south magnetic pole alignment.

The thermally-assisted magnetic field switching method utilizes the relatively large difference in the Curie temperature $T_C$ for the two different types of rare-earth permanent magnets 18 above. As the temperature of a permanent magnet is increased, the spontaneous magnetization of the permanent magnet will decrease and eventually vanish above a temperature called the Curie temperature $T_C$. Near the Curie temperature $T_C$, an energy barrier for switching the direction of magnetization of a permanent magnet can be significantly reduced while not destroying the spontaneous magnetization once the permanent magnet is cooled down to room temperature.

For the NdFeB permanent magnets 18, the Curie temperature is relatively low compared to the SmCo permanent magnets 18. Thus, when the NdFeB and SmCo permanent magnets 18 are both temporarily heated to a temperature within a range of 0–200° C. below the Curie temperature of the NdFeB permanent magnets, the magnetization of the NdFeB permanent magnets 18 can be switched with a lower external magnetic field than was initially used to magnetize the NdFeB and SmCo permanent magnets 18. In some instances, a magnetic field generated by the SmCo permanent magnets 18 can be sufficiently strong so as to switch the magnetization of the adjacent NdFeB permanent magnets 18 when substrate 50' containing the NdFeB and SmCo permanent magnets 18 is heated in the range of 0–200° C. below the Curie temperature of the NdFeB permanent magnets.

The NdFeB and SmCo permanent magnets 18 formed in the slots 40 can be initially magnetized all in the same direction using a high (≧30 kOe) external magnetic field which can be continuous or pulsed. The substrate 50' can then be heated to a temperature in the range 0–200° C. below the Curie temperature for the NdFeB permanent magnets 18. This reduces a threshold for switching of the magnetization of the NdFeB permanent magnets 18 to align with an oppositely-directed external magnetic field, with the threshold being further reduced as the temperature is further increased in the above range (i.e. as the temperature becomes closer to the Curie temperature for the NdFeB permanent magnets 18). The oppositely-directed external magnetic field preferably has a magnetic field strength which is above the threshold for switching the north-south magnetic pole alignment of the NdFeB permanent magnets 18, while being below a threshold for switching the north-south magnetic pole alignment of a remainder of the permanent magnets 18 (i.e. the SmCo permanent magnets 18 which have a much higher Curie temperature of 720–800° C.). Each permanent magnet 18 in FIG. 8 can be, for example, 100–150 µm wide and about 1.5 millimeters long, with adjacent permanent magnets 18 being separated by a spacing of 100 µm. The energy product BH for each rare-earth permanent magnet 18 in FIG. 8 can be about 10 MGOe.

As an example, the NdFeB permanent magnets 18 with $T_C$=350° C. can have an intrinsic coercivity $H_{ci}$ which is 10 kOe at room temperature and which is reduced to 5 kOe at a temperature of 150° C. The intrinsic coercivity $H_{ci}$ is a measure of the magnetic field strength which is required to switch the north-south magnetic pole alignment for a particular permanent magnet. The SmCo permanent magnets 18 can have a value of $H_{ci}$=17 kOe at room temperature, and 13 kOe at 150° C. In this case, to switch the north-south magnetic pole alignment of the NdFeB permanent magnets 18 while not substantially altering the north-south magnetic pole alignment of the SmCo permanent magnets 18, the substrate 50' containing the NdFeB and SmCo permanent magnets can be heated in an oven to a temperature of 150° C. and the oppositely-directed external magnetic field can have a magnetic field strength of, for example, 11–12 kOe. The substrate 50' can then be cooled down to room temperature with the oppositely-directed external magnetic field still applied, thereby resulting in the NdFeB and SmCo permanent magnets 18 having opposite north-south magnetic pole alignments.

It can also be possible to switch the magnetization of the NdFeB permanent magnets 18 using only the magnetic field produced by the SmCo permanent magnets 18. The SmCo permanent magnets 18 produce lines of magnetic flux φ which can loop around and pass through the NdFeB permanent magnets 18 in a manner similar to that shown in FIG. 3. At a temperature within the range of 0–200° C. below the Curie temperature of the NdFeB permanent magnets 18, the magnetic flux produced by the SmCo permanent magnets 18 can, in some instances, exceed the threshold for switching the magnetization state of the NdFeB permanent magnets 18. In this case, the NdFeB and SmCo permanent magnets 18 can be initially magnetized with the same north-south magnetic pole alignment using an external magnetic field as described above. The substrate 50' containing these permanent magnets 18 can then be heated to a temperature in the range of 0–200° C. below the Curie temperature of the NdFeB permanent magnets 18 so that the magnetic field strength provided by the SmCo permanent magnets 18 incident on the NdFeB permanent magnets 18 exceeds the threshold value of the intrinsic coercivity $H_{ci}$ required to switch the north-south magnetic pole alignment of the NdFeB permanent magnets 18 while not switching the remaining SmCo permanent magnets 18. The exact value of the temperature to which the substrate 50' and permanent magnets 18 must be heated can be learned from practice of the present invention. After the polarity of the NdFeB permanent magnets 18 has been switched, the substrate 50' can be cooled back down to room temperature.

Figure 11A:
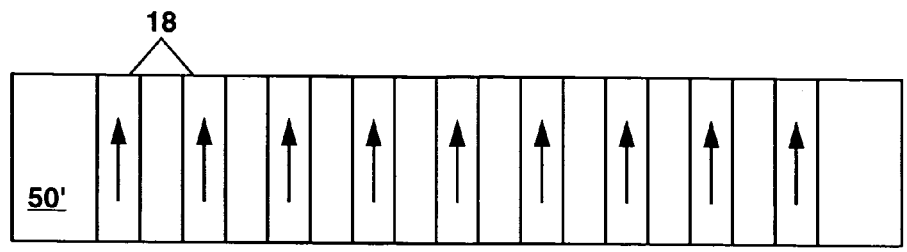
FIGS. 11A–11C schematically illustrate in cross-section view another thermally-assisted magnetic field switching method.
Figure 11B:
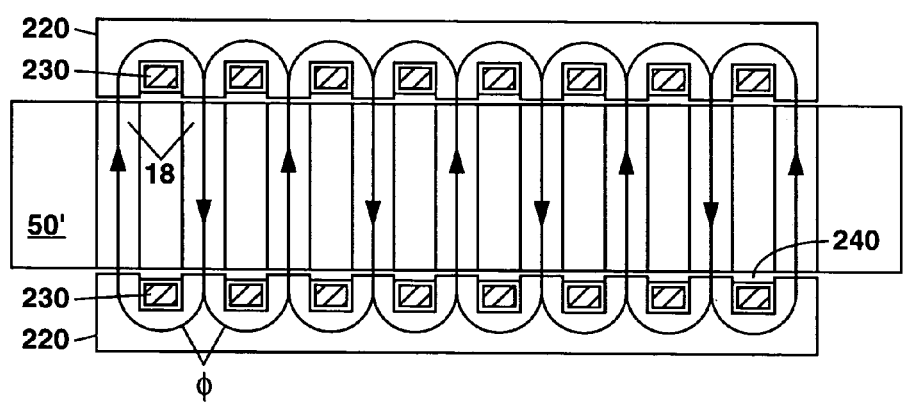

A soft-magnetic plate 220 having a Curie temperature higher than that of the NdFeB permanent magnets 18 can optionally be located on one or both sides of the substrate 50' to improve coupling of the magnetic field from the SmCo permanent magnets 18 into the NdFeB permanent magnets 18 as shown in FIG. 11B. This location of the soft-magnetic plate 220 proximate to one or both poles of the SmCo permanent magnets 18 enhances the oppositely-directed magnetic field produced by the SmCo permanent magnets 18 within the NdFeB permanent magnets 18 by channeling the lines of magnetic flux φ in a manner similar to that shown in FIG. 7. Once the substrate 50' has been cooled back down to room temperature, the soft-magnetic plate 220 can be removed.

Although this thermally-assisted magnetic field switching method above has been described in terms of switching the north-south magnetic pole alignment of the NdFeB permanent magnets 18 prior to forming the completed MEM device 10 as shown in FIG. 8, this method can also be used after assembly of the completed MEM device 10. In this case, the magnetic field produced by the SmCo permanent magnets 18 can be enhanced at the locations of the NdFeB permanent magnets 18 by any soft-magnetic layer 46 located in the device 10 and/or by passing a pulsed or continuous electrical current through the meandering electrical pickup 14 to produce an additional pulsed or continuous magnetic field which is additive to the magnetic field produced by the SmCo permanent magnets 18.

Figure 10A:
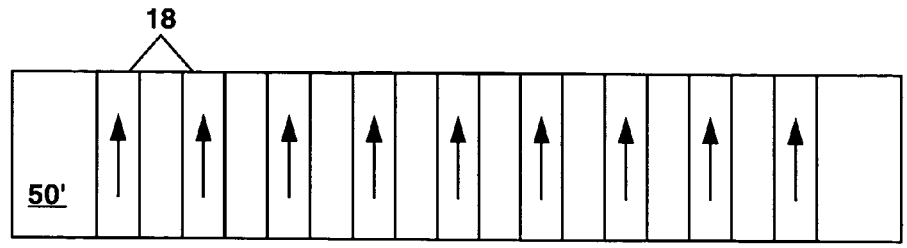
FIGS. 10A–10C show schematic cross-section views to illustrate a thermally-assisted magnetic field switching method for producing a plurality of permanent magnets with an alternating north-south magnetic pole alignment.

An alternate method can also be used when the rare-earth permanent magnets 18 in the example of FIG. 8 all have the same or a different material composition. This method is described hereinafter with reference to FIGS. 10A–10C which show schematic cross-section views of a portion of the substrate 50' with the permanent magnets 18 formed in the slots 40. In FIG. 10A, all the permanent magnets 18 (e.g. comprising NdFeB, or alternately comprising NdFeB and SmCo) can be initially magnetized in the same direction as indicated by the vertically-pointing arrows. As described previously, this can be done using an external magnetic field having a magnetic field strength of ≧30 kOe (generally a pulsed magnetic field oriented in the direction of the initial magnetization).

Figure 10B:
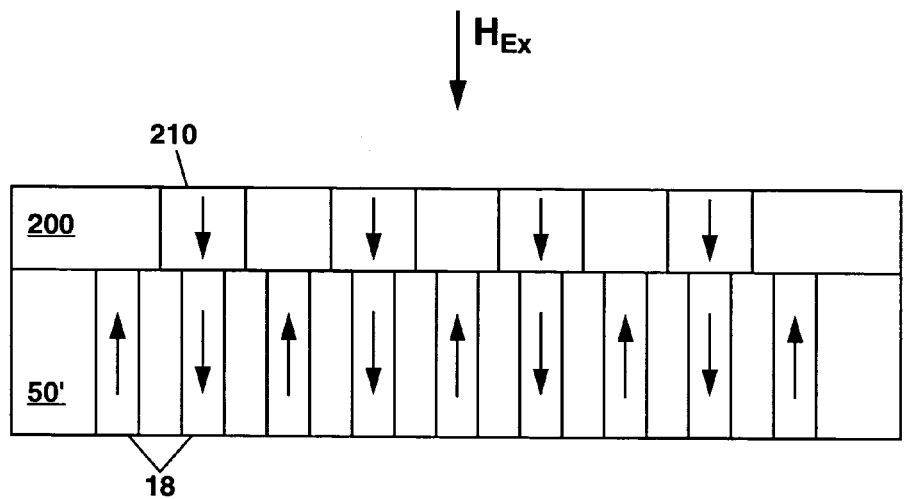
Figure 10C:
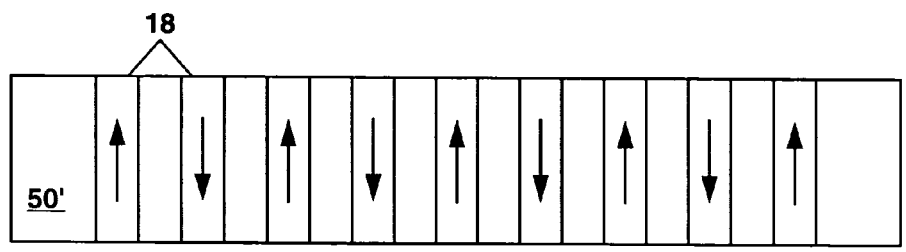

In FIG. 10B, a plate 200 comprising a non-magnetic material (e.g. a non-magnetic metal or metal alloy such as aluminum) with a plurality of elongate soft-magnetic regions 210 formed therein from a soft-magnetic material (e.g. NiFe, FeCo or NiFeCo) can be placed in contact with one or both major surfaces of the substrate 50', with each elongate soft-magnetic region 210 being aligned with every other permanent magnet 18. Each plate 200 can have lateral dimensions substantially equal to the substrate 50', and can further include a pair of through-holes (not shown) at the same locations of the through-holes 54' in the substrate 50' so that the plate 200 can be precisely aligned to the substrate 50' using a plurality of pins. The plate 200 and soft-magnetic regions 210 can be formed, for example, by LIGA by separately electroplating the non-magnetic material and the soft-magnetic regions 210, or alternately by etching or machining a plurality of slots at the locations of the soft-magnetic regions 210 and then filling in the slots with a soft-magnetic material (e.g. NiFe, FeCo or NiFeCo), for example, by electroplating. Any of the soft-magnetic material extending beyond the slots can be removed using a polishing step. The resulting elongate regions 210 can be about the same width or wider than the permanent magnets 18 so that each elongate region 210 covers only a single permanent magnet 18. The soft-magnetic material used for the regions 210 should preferably have a Curie temperature which is higher (e.g. by at least 100° C.) than that of the NdFeB rare-earth permanent magnets 18, and should also preferably be capable of providing a relatively high magnetic flux density in order to concentrate the external magnetic field $H_{EX}$.

With each plate 200 in place on the substrate 50', the plate(s) 200 and substrate 50' can be temporarily heated to a temperature near the Curie temperature of the permanent magnets 18 (e.g. about 150–300° C. for NdFeB permanent magnets 18) in the presence of a pulsed or continuous external magnetic field, HEX, which is directed opposite the north-south magnetic pole alignment of the permanent magnets 18. Each soft-magnetic region 210 concentrates the external magnetic field, $H_{EX}$, at the locations of every other permanent magnet 18 to provide a magnetic field strength which is above a threshold for switching the north-south magnetic pole alignment for the permanent magnets 18 superposed with the soft-magnetic regions 210. For the permanent magnets 18 not superposed with the soft-magnetic regions 210, the magnetic field strength of the external magnetic field is maintained below the threshold for switching the north-south magnetic pole alignment of these permanent magnets 18 so that they retain their initial magnetization state. It should be noted that the threshold for switching the alignment is the same for each NdFeB permanent magnet 18, but the magnetic field strength is different for the various NdFeB permanent magnets 18 depending on whether or not a particular NdFeB permanent magnet 18 is superposed with the soft-magnetic regions 210. The NdFeB permanent magnets 18 superposed with the soft-magnetic regions 210 experience a higher magnetic field strength and are switched in polarity; whereas the remaining NdFeB permanent magnets 18 not superposed with the soft-magnetic regions 210 are not switched in polarity due to a lower magnetic field strength at the locations of these permanent magnets 18. Furthermore, the flux lines from the soft-magnetic regions 210 reduce the net magnetic field strength in the permanent magnets 18 that are not superposed therewith.

The external magnetic field, $H_{EX}$, can be maintained in place as the substrate 50' and each plate 200 are cooled down to room temperature. The result is an alternating north-south magnetic pole alignment for the plurality of permanent magnets 18 after removal of each plate 200.

Another alternative method which can be used to change the north-south magnetic pole alignment of certain of the permanent magnets 18 when the permanent magnets 18 all have the same rare-earth composition (e.g. NdFeB) or different rare-earth compositions (e.g. with one-half of the magnets 18 comprising NdFeB, and with the remaining magnets 18 comprising SmCo) is described hereinafter with reference to FIGS. 11A–11C. In FIG. 11A, all the permanent magnets are initially aligned in the same direction using an external magnetic field as previously described. In FIG. 11B, a soft-magnetic plate 220 (e.g. comprising NiFe, FeCo or NiFeCo with a Curie temperature which is generally ≧400° C. and preferably ≧700° C.) with a meandering electrical conductor 230 is placed proximate to or against one or both major surfaces of the substrate 50'. The meandering electrical conductor 230 can be located in a plurality of slots 240 formed in the soft-magnetic plate 220, with the slots 240 being interconnected or open at each end and having the same spacing as the permanent magnets 18. The meandering electrical conductor 230 can be formed in the slots 240 or provided as insulated wire which is press fit therein. Through-holes (not shown) can be provided in each plate 220 for alignment with the through-holes 54' in the substrate 50', and to pin the assembly of the substrate 50' and plates 220 together.

The assembly can then be placed in an oven (not shown) and heated to a temperature which is in a range of 0–200° C. below the Curie temperature of the NdFeB rare-earth permanent magnets 18. A pulsed or direct current (dc) electrical current from a power supply (not shown) can then be passed through the conductor 230 to generate an external magnetic field sufficiently strong to switch the magnetic pole alignment of every other permanent magnet 18 as shown in FIG. 11B. The assembly can then be cooled down to room temperature with the external magnetic field applied to produce the north-south magnetic field alignment shown in FIG. 11C.

Figure 11C:
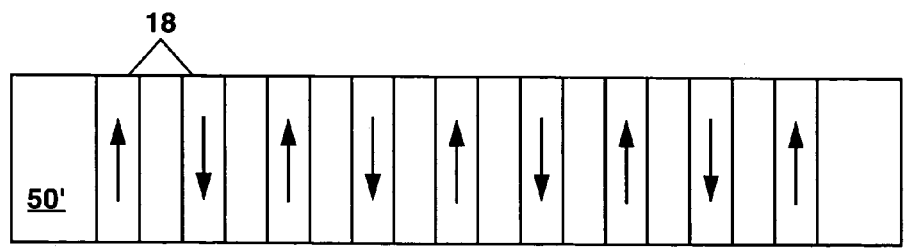

When certain of the permanent magnets 18 in FIGS. 11A–11C comprise SmCo, then the external magnetic field produced by the conductor 230 and plate 220 is preferably aligned with the SmCo permanent magnets 18 so that the SmCo permanent magnets will generate additional lines of magnetic flux $\phi$ to assist in switching the north-south magnetic pole alignment of the NdFeB permanent magnets 18.

Once the permanent magnets 18 have been formed in the substrate 50' and magnetized with an alternating north-south magnetic pole alignment, a photolithographically-defined mask can be provided over the substrate 50' and over the permanent magnets 18 with openings in the mask at the locations wherein the substrate 50' is to be etched using the second DRIE step described above. The second DRIE step etches completely through the substrate 50' to form the shuttle 16 and springs 20 from portions of the substrate 50'.

Additionally, the second DRIE step can be used to form a plurality of optional springs 56 which can be used to redirect the motion of the shuttle 16 when the shuttle 16 comes into contact with the springs 56. The springs 56 help to conserve momentum of the shuttle 16 and attached permanent magnets 18 to provide a relatively large back and forth movement of the shuttle 16 and magnets 18 while preventing the shuttle 16 from coming into direct contact with the substrate 50'. A plurality of optional stops 58 can also be formed in the substrate 50' as shown in FIG. 8 to further limit motion of the shuttle 16 and dampening springs 56 beyond a certain point. The dampening springs 56 can be, for example, 500–1000 μm long with a width of about 25–50 μm and a thickness equal to that of the substrate 50'.

In FIG. 8, the two substrates 50 and 50' can be attached together to complete the MEM apparatus 10. This can be done, for example, using an adhesive (e.g. epoxy), solder, or diffusion bonding, with a plurality of pins being inserted into the through-holes 54 and 54' to precisely align the two substrates 50 and 50'.

In other embodiments of the present invention, a pair of substrates 50 as shown in FIG. 9 can be sandwiched about the substrate 50' of FIG. 8 to provide a meandering electrical pickup 14 on each side of the shuttle 16 to provide an increased electrical output power or voltage signal. To facilitate the attachment of external wires to the contact pads 24 in this case, a plurality of cutouts 60 can be formed in each substrate 50 during the DRIE step used for etching the through-holes 54 to provide access to the contact pads 24 when a pair of the substrates 50 are sandwiched about the substrate 50'.

Each MEM device 10 described herein can be hermetically packaged at ambient pressure or under a reduced pressure or vacuum to reduce a viscous damping on the movement of the shuttle 16 due to the ambient pressure.

Although the MEM apparatus 10 has been described as being fabricated by LIGA or micromachining, other embodiments of the MEM apparatus 10 can be fabricated using electrical discharge machining (EDM) as known to the art. Furthermore, in certain embodiments of the present invention, the permanent magnets 18 can be formed in the shuttle 16 by electroplating.

The methods for forming the plurality of permanent magnets with different north-south magnetic pole alignments have been described heretofore in terms of heating to a temperature in the range of 0–200° C. below the Curie temperature of the NdFeB permanent magnets 18, or whichever type of permanent magnet 18 has the lower Curie temperature when two different types of permanent magnets 18 are used in the MEM apparatus 10 of the present invention. When two different types of permanent magnets 18 are used in the MEM apparatus 10, the methods described heretofore for providing two different north-south magnetic pole alignments can be extended to heat the permanent magnet 18 having the lower Curie temperature to a temperature that is above that Curie temperature but still well below the Curie temperature of the other type of permanent magnet 18 having the higher Curie temperature.

As an example, when the two types of permanent magnets 18 comprise NdFeB with a Curie temperature in the range of 310–365° C. and SmCo with a Curie temperature in the range of 720–800° C., heating the two types of permanent magnets 18 to a temperature above the Curie temperature of the NdFeB permanent magnets 18 will permanently destroy an initial magnetism in the NdFeB permanent magnets 18 but will not substantially alter either the initial magnetism or the north-south magnetic pole alignment of the SmCo permanent magnets 18 which have a much higher Curie temperature. Thus, the two types of permanent magnets 18 to be utilized in the MEM apparatus 10 can be initially magnetized with the same north-south magnetic pole alignment. The NdFeB and SmCo permanent magnets 18 can then be heated to a temperature in the range of 0–100° C. above the Curie temperature of the NdFeB permanent magnets 18 thereby destroying the initial magnetism in these magnets 18 and rendering them paramagnetic. The above temperature range to which the NdFeB and SmCo permanent magnets 18 are heated is still several hundred degrees below the Curie temperature of the SmCo permanent magnets 18 so that the initial magnetism in the SmCo permanent magnets 18 will not be appreciably affected by the heating. The NdFeB and SmCo permanent magnets 18 can then be cooled down to room temperature in the presence of an external magnetic field HEX as previously described with reference to FIGS. 10A–10C having a magnetic field strength which is below the intrinsic coercivity $H_{ci}$ of the SmCo permanent magnets 18, or in the presence of the magnetic field from the SmCo permanent magnets 18, or both. Upon cooling down below the Curie temperature of the NdFeB permanent magnets 18, the NdFeB permanent magnets 18 will once again become ferromagnetic and will be remagnetized with a north-south magnetic pole alignment that is opposite that of the SmCo permanent magnets 18.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical (MEM) apparatus, comprising:
   (a) a meandering electrical pickup disposed on a substrate; and
   (b) a plurality of permanent magnets spaced apart side-by-side and suspended above the substrate by a soft-magnetic shuttle, with the plurality of permanent magnets generating an electrical voltage across the meandering electrical pickup in response to a movement of the plurality of permanent magnets in a direction substantially parallel to a surface of the substrate.

2. The MEM apparatus of claim 1 wherein the shuttle is suspended above the substrate by a plurality of springs.

3. The MEM apparatus of claim 2 wherein each spring comprises a folded spring.

4. The MEM apparatus of claim 2 wherein a resonant frequency of the shuttle and the plurality of permanent magnets is substantially equal to a dominant resonant frequency of a vibration which produces the movement of the shuttle.

5. The MEM apparatus of claim 1 wherein each permanent magnet has a north-south magnetic pole alignment which is substantially the same.

6. The MEM apparatus of claim 5 wherein each permanent magnet comprises a rare-earth permanent magnet.

7. The MEM apparatus of claim 6 wherein the rare-earth permanent magnet comprises neodymium-iron-boron (NdFeB) or samarium-cobalt (SmCo).

8. The MEM apparatus of claim 1 further comprising a layer of a soft-magnetic material on the substrate beneath the meandering electrical pickup.

9. The MEM apparatus of claim 8 wherein the soft-magnetic material is selected from the group consisting of nickel-iron (NiFe), iron-cobalt (FeCo), nickel-iron-cobalt (NiFeCo) and iron-aluminum-nitride (FeAlN).

10. A microelectromechanical (MEM) apparatus, comprising:
   (a) a meandering electrical pickup disposed on a substrate; and (b) a plurality of permanent magnets spaced apart side-by-side and suspended above the substrate, with the plurality of permanent magnets having an alternating north-south magnetic pole alignment and generating an electrical voltage across the meandering electrical pickup in response to a movement of the plurality of permanent magnets in a direction substantially parallel to a surface of the substrate.

11. The MEM apparatus of claim 10 wherein the plurality of permanent magnets comprises a plurality of alternating pairs of permanent magnets having different Curie temperatures.

12. The MEM apparatus of claim 11 wherein one of the permanent magnets in each alternating pair of the permanent magnets comprises neodymium-iron-boron (NdFeB), and the other permanent magnet comprises samarium-cobalt (SmCo).

13. The MEM apparatus of claim 1 wherein each permanent magnet comprises a rare-earth permanent magnet.

14. A microelectromechanical (MEM) apparatus, comprising:
(a) a meandering electrical pickup disposed on a substrate;
(b) a soft-magnetic shuttle suspended above the substrate and moveable in response to vibrations operatively coupled to the shuttle; and
(c) a plurality of permanent magnets supported by the shuttle, with the plurality of permanent magnets producing an electrical voltage across the meandering electrical pickup in response to a vibration-induced movement of the shuttle.

15. The MEM apparatus of claim 14 wherein the shuttle is suspended above the substrate by a plurality of springs.

16. The MEM apparatus of claim 15 wherein a resonant frequency of the shuttle and the plurality of permanent magnets is substantially equal to a dominant resonant frequency of the vibrations.

17. The MEM apparatus of claim 14 wherein each permanent magnet has a north-south magnetic pole alignment which is substantially the same.

18. The MEM apparatus of claim 17 wherein each permanent magnet comprises a rare-earth permanent magnet.

19. The MEM apparatus of claim 18 wherein the rare-earth permanent magnet comprises neodymium-iron-boron (NdFeB) or samarium-cobalt (SmCo).

20. The MEM apparatus of claim 14 further comprising a layer of a soft-magnetic material on the substrate beneath the meandering electrical pickup.

21. The MEM apparatus of claim 20 wherein the soft-magnetic material is selected from the group consisting of nickel-iron (NiFe), iron-cobalt (FeCo), nickel-iron-cobalt (NiFeCo) and iron-aluminum-nitride (FeAlN).

22. A microelectromechanical (MEM) apparatus, comprising:
(a) a meandering electrical pickup disposed on a substrate:
(b) a shuttle suspended above the substrate and moveable in response to vibrations operatively coupled to the shuttle; and
(c) a plurality of permanent magnets supported by the shuttle, with the plurality of permanent magnets having an alternating north-south magnetic pole alignment and producing an electrical voltage across the meandering electrical pickup in response to a vibration-induced movement of the shuttle.

23. The MEM apparatus of claim 22 wherein the plurality of permanent magnets comprises alternating pairs of permanent magnets having different Curie temperatures.

24. The MEM apparatus of claim 23 wherein one of the permanent magnets in each alternating pair of the permanent magnets comprises neodymium-iron-boron (NdFeB), and the other permanent magnet comprises samarium-cobalt (SmCo).

25. The MEM apparatus of claim 14 wherein each permanent magnet comprises a rare-earth permanent magnet.

26. A MEM apparatus, comprising:
(a) a moveable shuttle holding a plurality of elongate permanent magnets arranged side by side, with a substantially identical spacing between adjacent permanent magnets of the plurality of elongate permanent magnets; and
(b) a meandering electrical pickup located on each side of the shuttle on a different substrate for generating an electrical voltage in response to a movement of the shuttle and the plurality of elongate permanent magnets.

27. The MEM apparatus of claim 26 further comprising a layer of a soft-magnetic material on the substrate beneath the meandering electrical pickup.

28. The MEM apparatus of claim 26 wherein the shuttle comprises a soft magnetic material, and each permanent magnet has a north-south magnetic pole alignment which is substantially the same.

29. The MEM apparatus of claim 26 wherein the plurality of elongate permanent magnets have an alternating north-south magnetic pole alignment.

30. A microelectromechanical (MEM) apparatus, comprising:
(a) a meandering electrical pickup disposed on a substrate; and
(b) a plurality of permanent magnets spaced apart side-by-side and suspended above the substrate on a non-magnetic shuttle, with the plurality of permanent magnets generating an electrical voltage across the meandering electrical pickup in response to a movement of the plurality of permanent magnets in a direction substantially parallel to a surface of the substrate.

* * * * *